US 6,684,794 B2

(12) United States Patent
Fiske et al.

(10) Patent No.: US 6,684,794 B2
(45) Date of Patent: Feb. 3, 2004

(54) MAGNETICALLY LEVITATED TRANSPORTATION SYSTEM AND METHOD

(75) Inventors: Orlo James Fiske, Goleta, CA (US); Chen Chen, Santa Barbara, CA (US); Michael Richard Ricci, Newbury Park, CA (US); Bradley Evan Paden, Santa Barbara, CA (US)

(73) Assignee: Magtube, Inc., Goleta, CA (US)

( * ) Notice: Subject to any disclaimer, the term of this patent is extended or adjusted under 35 U.S.C. 154(b) by 0 days.

(21) Appl. No.: 10/140,729

(22) Filed: May 7, 2002

(65) Prior Publication Data

US 2003/0217668 A1 Nov. 27, 2003

(51) Int. Cl.[7] ............................................. B61B 13/00
(52) U.S. Cl. ...................... 104/281; 104/283; 104/286
(58) Field of Search ................................. 104/281, 282, 104/283, 286; 335/306, 216, 296, 302

(56) References Cited

U.S. PATENT DOCUMENTS

| 3,158,765 A | | 11/1964 | Polgreen | |
| 3,407,749 A | * | 10/1968 | Frig | 381/135 |
| 3,791,309 A | * | 2/1974 | Baermann | 104/283 |
| 3,885,504 A | * | 5/1975 | Baermann | 104/283 |
| 3,899,979 A | | 8/1975 | Godsey, Jr. | |
| 3,937,148 A | | 2/1976 | Simpson | |
| 3,976,339 A | | 8/1976 | Sabnis | |
| 4,356,772 A | | 11/1982 | van der Heide | |
| 4,486,729 A | | 12/1984 | Lee | |
| 4,646,651 A | | 3/1987 | Yamamura et al. | |
| 4,805,761 A | | 2/1989 | Totsch | |
| 5,165,347 A | | 11/1992 | Wagner | |
| 5,243,919 A | | 9/1993 | Ninomiya | |
| 5,433,155 A | | 7/1995 | O'Neill et al. | |
| 5,440,997 A | | 8/1995 | Crowley | |
| 5,601,029 A | | 2/1997 | Geraghty et al. | |
| 5,722,326 A | * | 3/1998 | Post | 104/281 |
| 6,374,746 B1 | | 4/2002 | Fiske | |
| 6,418,857 B1 | * | 7/2002 | Okano et al. | 104/281 |
| 2003/0005851 A1 | * | 1/2003 | Post | 104/281 |
| 2003/0006871 A1 | * | 1/2003 | Post | 335/306 |
| 2003/0052548 A1 | * | 3/2003 | Hol | 310/12 |

* cited by examiner

Primary Examiner—Mark T. Le
(74) Attorney, Agent, or Firm—Foley & Lardner

(57) ABSTRACT

A magnetically levitated transportation system employs permanent magnet rails along a guideway that interact with permanent magnets on a vehicle. The rails are optimized to reduce magnetic mass, while maximizing lift force. In one example, the arrays are composed of arrays of magnets having rotating magnetizations, such as Halbach arrays. In another example, the arrays are cup-shaped to provide stronger magnetic field forces in the central portion of the array, relative to the lateral portion of the array. The vehicle may be stabilized in the lateral and yaw directions with feedback controlled lateral control coils that interact with the permanent magnet rails on the guideway. Vertical, pitch and roll motions may be controlled or damped with eddy-current damper coils or plates or with active feedback control to control the coils.

107 Claims, 19 Drawing Sheets

Cost function = 78984

Cost function = 47527

Cost function = 23814

Cost Function = 24886

Cost function = 25093

MAGNETICALLY LEVITATED TRANSPORTATION SYSTEM AND METHOD

FIELD OF THE INVENTION

The present invention relates, generally, to transportation systems and processes, and in particular embodiments, to ground-based transportation systems and processes employing magnetically levitated vehicles for transportation of freight or passengers. Preferred embodiments are configured for relatively low-cost and energy efficient implementations.

BACKGROUND OF THE INVENTION

It is widely recognized that transportation of freight and passengers is a necessary component of modern economic societies. In the last century, significant advances have been made with respect to speed and efficiency of transportation systems. Such advances have been driven, at least in part, by economic demand. Indeed, high-speed transportation of freight and passengers has long been recognized as having significant economic value. This is evidenced by the widespread use of air transportation and increasing use of high-speed rail in both freight and passenger markets.

However, there are a number of shortcomings of conventional transportation systems. Traditional high-speed rail systems require mechanical contact between wheels and rail, giving rise to wear, frictional losses of energy and vibrations. In addition, conventional air and rail systems experience significant aerodynamic drag, which increases energy costs. Moreover, modern air transportation requires human pilots, ground control systems, and expensive airports. Past efforts to address some of those shortcomings have included efforts to develop a practical magnetically levitated train system.

Magnetically levitated (maglev) vehicles have long been proposed for high-speed transportation. Several prototypes of such systems have been developed that would require costly infrastructure in the form of heavy and precise track systems or expensive superconducting magnets. In some prior systems, massive trains have been proposed, requiring massive, expensive infrastructure. In addition, prior systems have employed relatively complex geometries, due to a perceived necessity to provide horizontal surfaces to create levitation forces and vertical surfaces to create lateral forces. Moreover, since electromagnets can only generate attractive forces, some proposed systems have included vehicles configured with awkward and heavy structures that reach underneath an iron rail to create lift. Furthermore, many of the previously proposed magnetically levitated transportation systems are designed to operate in an open or ambient atmosphere, such that aerodynamic drag can be a major factor contributing to energy consumption.

An understanding of magnetically levitated transportation involves a basic understanding of the magnetic forces that can be created by the interaction of permanent magnets. For example, it is well known that opposite magnetic poles provide an attraction force and like poles provide a repelling force. A magnetic field can produce a force on a current carrying conductor, typically referred to as a Lorentz force.

A force is also created in a magnetic gap between two iron pole faces. Such a force, known as the Maxwell force, is proportional to the square of the magnetic field. In some magnetic actuators, such as variable reluctance motors, salient or toothed poles are used to create Maxwell forces parallel to the pole faces. Actuators that are based on this principle are typically referred to as salient pole Maxwell actuators. Magnetic induction is another means of producing magnetic force. By moving a magnetic field source rapidly over a conductive sheet, an image of the magnet source is created in the sheet. Since the image of a magnetic pole has the same polarity as the magnetic pole itself, a repulsion force is created.

Prior magnetically levitated train systems have been proposed, wherein some of those principles of magnetic forces are employed. For example, in U.S. Pat. No. 5,601,029, to Geraghty et al., a permanent magnet rail array is used for levitation and Maxwell force actuators are used for lateral and yaw stabilization. The Maxwell force actuators interact with an iron side-rail with high loads. The side-rails described in the Geraghty et al. patent would tend to add considerable cost and weight to the overall guide-rail system. In addition, due to the geometry of the permanent magnets described in the Geraghty et al. patent, the levitation function requires a relatively large mass (and weight) of magnets, thus, resulting in a relatively costly implementation of the design.

Also, in U.S. Pat. No. 4,486,729 to Lee, a permanent magnet rail array is used for levitation and mechanical bushings are used for lateral and yaw control. While the loading on the mechanical bushings is small relative to the levitation force, this system is subject to wear and not likely suitable for high-speed use. A similar approach is taken in U.S. Pat. Nos. 5,165,347 and 3,158,765.

In U.S. Pat. No. 4,356,772 to van der Heide, a permanent magnet rail array is used for levitation and periodic vertical forcing is used to create dynamics described by the Matthieu equation. Such an arrangement can be sensitive to variations in load mass and may not be sufficiently robust for commercial use.

In U.S. Pat. Nos. 5,440,997 and 4,805,761, permanent magnet levitation is employed, where a shear displacement between magnets is created during vehicle motion and a resulting shear restoring force is supplied by the permanent magnet interaction. Air bearings and bushings are used (respectively) in these two patents for lateral stabilization. Air bearings require relatively small gaps for operation and are thus subject to mechanical contact and, thus, wear, when there are variations in the track surface.

In U.S. Pat. No. 3,899,979 to Godsy, Maxwell force levitation actuators are employed. Those actuators rely on reluctance centering of actuator teeth for lateral stabilization. In addition, the actuators on the Godsy system are overhung and require additional support structure on the vehicle, resulting in a relatively high cost system. Moreover, the large amount of iron in this system can add considerable weight to the vehicle.

The system described in U.S. Pat. No. 3,937,148 to Simpson uses Maxwell force levitation and guidance actuators. The Simpson system requires a relatively large amount of iron on the vehicle and track, as the guidance actuators employ a vertical iron surface for actuation. Similar limitations are encountered in the systems described in U.S. Pat. Nos. 5,243,919, 4,646,651, and 3,976,339, where large lateral forces must be accommodated with heavy, relatively expensive structural elements.

The system described in U.S. Pat. No. 5,433,155 to O'Neill et al. uses Lorentz force actuators. One embodiment uses permanent magnets to produce the fields that interact with electrical currents. Lorentz force actuators supply vertical forces in this design so that high currents are needed in coils. Such a scheme is less efficient than one that employs permanent magnets for levitation. Moreover the O'Neill et al. system requires complex interleaved track and vehicle components.

A common feature of such prior designs is that the vehicle structure wraps partially around the track structure or the track structure wraps partially around the vehicle structure. Such structures can be complex and heavy, as they support high loads applied to cantilevered substructures. An indication of the complexity of these systems is that there is no single plane that separates the vehicle magnetic components from the track magnetic components. This follows from the use of both vertical and horizontal magnetic gaps in such designs. Simpler transportation systems have used wheeled vehicles on a road or guideway, where the road defines a plane in contact with the vehicle wheels.

SUMMARY OF THE DISCLOSURE

Embodiments of the present invention relate, generally, to magnetic levitation transportation systems and processes which address some or all of the problems noted above with respect to conventional magnetic levitation systems. For example, an advantage, according to various embodiments of the invention, relates to a relatively simple structural configuration wherein permanent magnets are employed on a vehicle for providing (or contributing to) levitation and electromagnets are employed on a vehicle for providing (or contributing to) lateral control of the vehicle relative to a guideway array of magnets.

A further advantage, according to various embodiments of the invention, relates to magnetic levitation transportation systems and processes that employ a relatively simple structural configuration that avoids the need for complex lateral support structure on the guideway. Instead, lateral and vertical control is provided with a simplified guideway and vehicle structure in which a separation plane separates the vehicle magnetic components from the track magnetic components during levitation of the vehicle, where the separation plane does not pass through or contact either the guideway structure or the vehicle structure.

A further advantage, according to various embodiments of the invention, relates to magnetic levitation transportation systems and processes that make efficient use of magnetic field energy from permanent magnets by employing magnet materials or arrays that have a rotating magnetization, to provide (or contribute to) levitation of a vehicle over a guideway. For example, embodiments of the invention employ one or more guideway magnet arrays having rotating magnetization, wherein the magnetization vector of the array (or material) rotates in a consistent direction when viewed in section and within increments of less than 180 degrees including the limiting case where the increments are infinitesimal and the rotation is continuous. Further embodiments employ one or more guideway magnet arrays having counterclockwise rotating magnetization when viewed left to right with the interfacing (or "active") surface is facing upward. Further references herein to "counterclockwise rotation" will be understood to refer to the direction of rotation, when viewed as noted above. If the active surface is facing downward, as is the case with vehicle magnets, then the magnetization rotation direction is counterclockwise, when viewed from the right to the left side of the array. Preferred embodiments employ one or more Halbach arrays with rotating magnetization. Such rotating magnetization arrays (and, in particular, Halbach arrays) allow magnetic field energy to be more efficiently directed on one side (the active side) of the array.

A further advantage, according to various embodiments of the invention, relates to magnetic levitation transportation systems and processes that make efficient use of magnetic field energy from permanent magnets by employing magnet arrays (or materials) that have stronger magnets (or magnetic field energy) in the central portion of the array (or material), than at the lateral sides of the array (or material). For example, various embodiments of the invention employ magnet arrays having larger (thicker) magnets in the central portion of the array and smaller (thinner) magnets at the lateral sides of the array. In some embodiments, a cross-section shape of such an array resembles a cup shape or inverted cup shape. Such cup-shaped arrays may be employed as vehicle magnets and/or guideway magnets.

A further advantage, according to various embodiments of the invention, relates to a relatively simple structural configuration that employs two distinct sub-arrays of guideway magnets. Similarly, various embodiments of the invention employ two distinct sub-arrays of vehicle magnets for interaction with guideway magnets to provide (or contribute to) levitation of the vehicle relative to the guideway magnets. In yet further embodiments, each sub-array of guideway magnets interacts with at least one permanent magnet (or magnet array) on the vehicle and at least one electromagnet (or control coil array) on the vehicle.

Further advantages relating to cost, weight and power efficiency may be achieved, according to yet further embodiments of the invention, for example, by employing relatively lightweight capsules dispersed along guideways. Further efficiencies may be achieved by employing configurations that allow the generation of both levitation and lateral forces from the same guideway magnet array (or rail). Yet further efficiencies may be achieved by employing optimized Halbach or rotating magnet array structures, for example, to minimize the amount of permanent magnet material used in the guideway magnet array. In yet further embodiments, cup-shaped magnet arrays may be employed to minimize overall guideway array (or rail) weight, while maintaining the same lift capability.

In yet further embodiments, further power efficiencies may be achieved by employing only permanent magnets to provide levitation force (or the majority of the levitation force) for levitating the vehicle relative to the guideway and operating the vehicle in a vacuum (or partial vacuum). For example, the vehicle may be levitated and propelled with a tube-shaped guideway structure that is evacuated (or partially evacuated).

These and other aspects and advantages of embodiments of the present invention will become more apparent from the following detailed description and the accompanying drawings in which various embodiments of the present invention are shown by way of illustrative example.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1A:
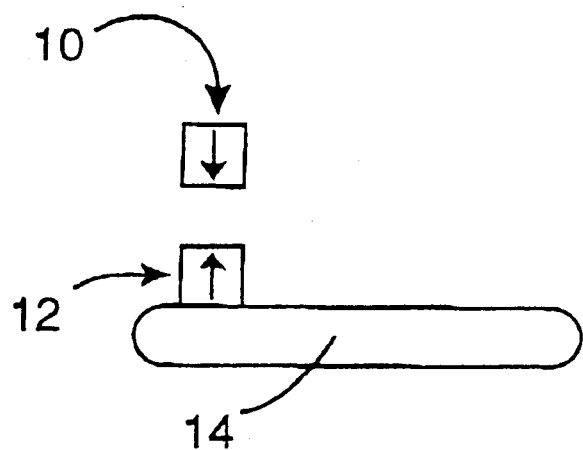
FIGS. 1a and 1b each show a schematic representation of an arrangement of permanent magnets, to illustrate known principles of magnetic interaction.

The following detailed description is of the best presently contemplated mode of implementing embodiments of the invention. This description is not to be taken in a limiting sense, but is made merely for the purpose of illustrating the general principles of the invention. The scope of the invention is best defined by the appended claims.

The present invention relates, generally, to transportation systems and processes, and in particular embodiments, to such systems and processes employing magnetically levitated vehicles for transportation of freight or passengers. A transportation system, according to embodiments of the invention, includes at least one vehicle and a guideway along which the vehicle is capable of traveling. In preferred embodiments, the vehicle is capable of carrying freight or passengers and includes one or more compartments or supports for holding freight or passengers.

As described in further detail below, the vehicle supports one or more magnets (or arrays of magnets) and one or more electromagnets for providing levitation and lateral control functions. The magnets (or magnet arrays) may comprise any suitable permanent magnet or magnetized material having a relatively large intrinsic coercivity, including, but not limited to well known alloys of neodymium-iron-boron, ferrite, samarium-cobalt, or the like. The electromagnets may comprise electromagnetic coils or other suitable structures for creating an electromagnetic field.

The guideway comprises a structure for supporting one or more (and, preferably, two) distinct arrays of permanent magnets. As described in further detail below, the permanent magnet(s) and electromagnet(s) carried by the vehicle are arranged to interact with guideway array(s) to produce a lift force of sufficient magnitude to levitate the vehicle relative to the guideway array(s), when the vehicle is disposed on the guideway. In preferred embodiments, the majority (or all) of the lift force for levitation of the vehicle is provided by interaction of one or more permanent magnets on the vehicle with the guideway array(s), while the primary purpose of the electromagnet(s) on the vehicle is for lateral control and/or vertical damping. In other embodiments, the electromagnet(s) may be employed to provide a greater contribution to the lift force for levitating the vehicle.

The guideway magnet array(s) may be disposed along the length of the guideway structure. The guideway array(s) may be formed continuous along the length of the guideway or with small gaps between magnets, for example, due to manufacturing constraints. In further embodiments, the guideway array(s) may be disposed in a discontinuous fashion, along the length of the guideway structure, provided the array(s) allow continuity in operation of the vehicle along the length of the guideway structure.

In this manner, the vehicle may travel along the length of the guideway, while magnetic interaction continues between the guideway magnet array(s) and the vehicle magnet(s) and electromagnet(s). The vehicle may be propelled along the guideway structure by any suitable drive or propulsion subsystem means, including, but not limited to electromagnetic propulsion as described in the above-referenced Fiske patent, pressurized gas propulsion, gravitational forces, or the like. Preferred embodiments employ a linear motor, such as, but not limited to, induction, synchronous permanent magnet (brushless), SERAPHIM as developed at Sandia National Laboratories, variable reluctance or other suitable configurations.

The guideway may comprise a road-like structure, an elevated rail-like structure, or other suitable guide or path, for supporting the guideway magnet array(s). Further example embodiments of the invention employ tube-shaped guideway structures, for example, of the type described in U.S. patent application Ser. No. 09/499,604, titled "Magnetic Levitation Transpo rtation System And Method," to Orlo James Fiske (co-inventor of the present invention), the disclosure of which is incorporated herein by reference. As described in the Fiske patent application, a tube-shaped guideway can be evacuated (or partially evacuated), to minimize air resistance and other problems associated with air-flow dynamics, as the vehicle travels along the length of the guideway. Thus, example embodiments of the invention may employ one or more guideway magnet arrays disposed along the length of a tube-shaped guideway system of the type described in the above-cited Fiske patent application. Further embodiments of the invention may employ other aspects of the guideway structures described in the Fiske patent application, including routing chambers, loading rooms, platooning of multiple vehicles, bridges, parking structure, refrigerated storage system for perishables, etc., whether or not the guideway is tube-shaped.

Unique arrangements and configurations of magnets and electromagnets allow embodiments of the present invention to be implemented and operated in a relatively efficient manner. These arrangements are described in connection with example embodiments of the invention, with reference to certain known principles of magnetic and electromagnetic interaction. These known principles are described with reference to FIG. 1a through FIG. 3d.

Figure 1B:
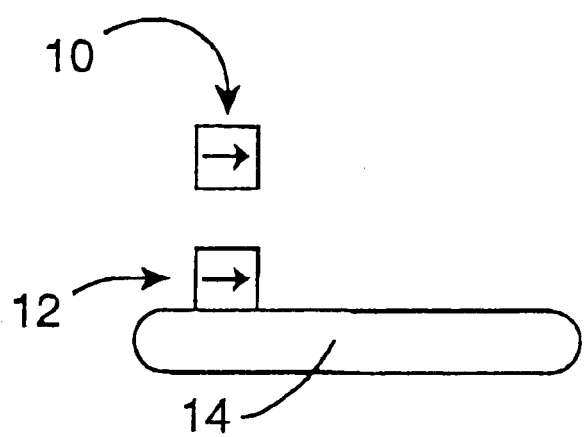

For example, in the arrangement in FIGS. 1a and 1b, a pair of permanent magnets 10 and 12 are shown in two different arrangements in which a repulsive force is created between the magnets. In each of those examples, the permanent magnet 12 is shown as being supported by a support member 14. The arrows on the magnets 10 and 12 represent the direction of magnetization, with the arrow head denoting a particular pole, for example, the north (N) pole, while the arrow tail denotes the opposite pole, for example, the south (S) pole.

In each of the arrangements shown in FIGS. 1a and 1b, the magnets 10 and 12 are arranged with common poles adjacent (or facing) each other. In FIG. 1a, a single pole (for example, the N pole) of magnet 10 is facing a single, common pole of the other magnet 12. In FIG. 1b, two poles (the N and the S pole) of the magnet 10 are adjacent (facing) the corresponding two poles of the other magnet 12.

In the arrangements shown in FIGS. 1a and 1b, if the support member 14 is fixed and the magnets 10 and 12 are in sufficiently close proximity, a repulsive force is imparted on the magnet 10 in the direction away from magnet 12 (in the direction toward the top of the page in FIGS. 1a and 1b). By arranging the magnets 10 vertically over magnet 12 and supporting magnet 12 in a fixed position, the repulsive force on the magnet 10 becomes a vertical lift or levitation force on the magnet 10.

Figure 2A:
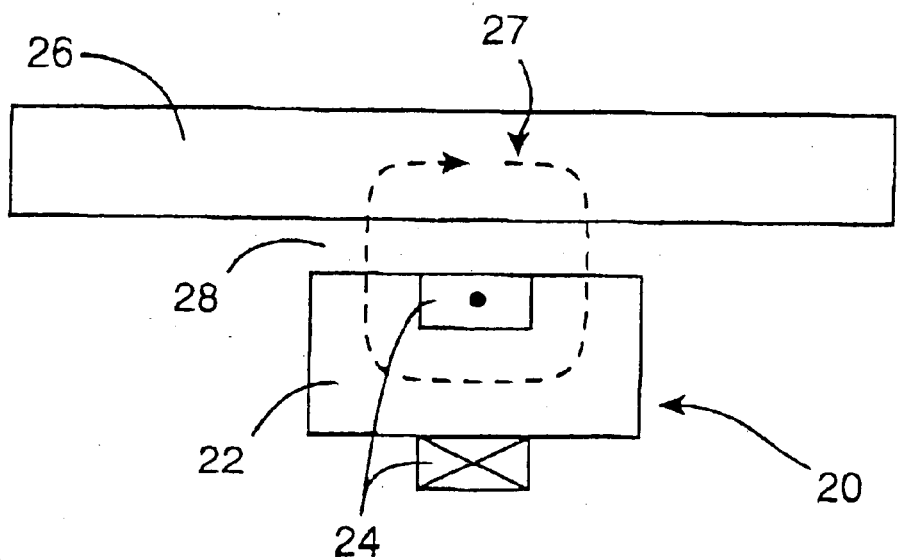
FIGS. 2a and 2b each show a schematic representation of an electromagnet arrangement, to illustrate additional known principles of electromagnetic interaction.
Figure 2B:
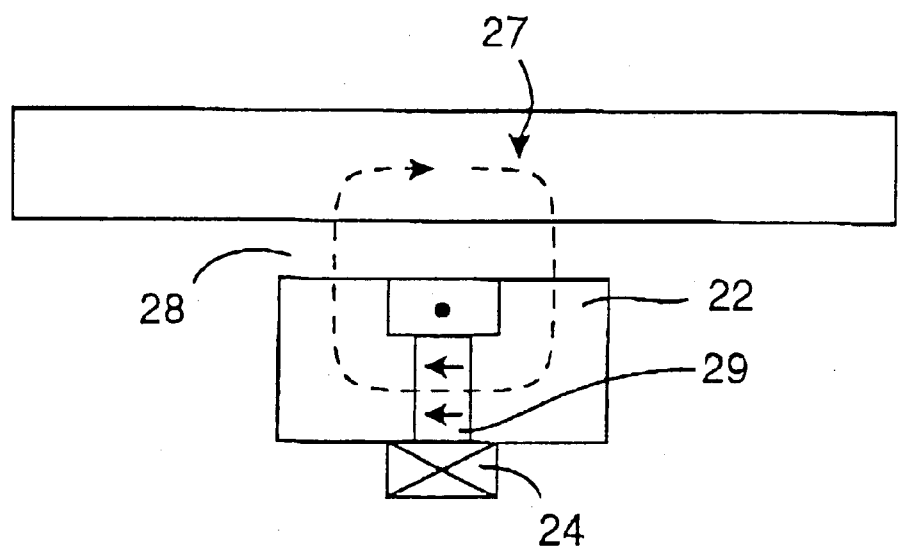

Examples of electromagnet configurations for providing an attraction force are shown in cross-section, in FIGS. 2a and 2b. In those example configurations, an electromagnet 20 includes a magnetically permeable core 22 that is surrounded by a coil 24. The coil 24 is coupled to a current source (not shown) to energize and provide a current flow in the coil. The direction of current flow in the coil 24 is represented by a dot and a cross (for example, with the cross representing a vector into the page and the dot representing a vector out of the page).

When the electromagnet 20 is energized, then a magnetic flux 27 is created through the core 22. In FIGS. 2a and 2b, the electromagnet 20 is arranged in the proximity of, but spaced apart from, a magnetically permeable member 26 by a gap 28. Thus, the path of the magnetic flux 27 in FIGS. 2a and 2b extends through the core 22, across the gap 28, through the member 26 and back across the gap 28 to complete the magnetic circuit. As a result, an attractive force is created between the electromagnet 20 and the magnetically permeable member 26, in the direction of closing the gap 28. An attractive force is created, irrespective of the direction of current flow in the coil 24 and, thus, irrespective of the sign of the flux 27.

The force F of attraction is proportional to the square of the flux, as defined in the well-known equation: $F=B^2 A/2\mu_0$, where B is the magnetic field strength, A is the total pole face area and $\mu_0$ is the permeability of the air in the gap.

Accordingly, in electromagnetic actuators that are based on the principles of FIGS. 2a and 2b, a bias current may be provided in the coil 24, to increase the sensitivity of the actuator to small changes in current. However, such bias currents tend to consume power, by creating ohmic losses.

In the arrangement shown in FIG. 2b, a bias magnet 29 may be employed to provide a bias flux, without additional power consumption. The bias magnet 29 may be employed instead of or in addition to a bias current in the coil. The bias magnet 29 may comprise one or more permanent magnets arranged to provide an overall bias flux in a direction or polarity common to that of the flux 28 generated from the energization of the coil 24. While the bias magnet 29 tends to introduce additional reluctance in the magnetic circuit, some improvement in power consumption (relative to a configuration employing only bias current) may be provided with appropriate design considerations by one of ordinary skill in the art.

In FIGS. 3a through 3d, interactions of various arrangements of current carrying conductors (for example, coil conductors) with a permanent magnet are illustrated, to create forces in various directions. The arrangements in FIGS. 3a through 3d employ the principles of "Lorentz'law." According to Lorentz'law, the force F on a current-carrying conductor in a magnetic field is given by $F=iL\times B$. The force is equal and opposite on the permanent magnet and the current carrying conductor, but is shown only on the conductor, as the drawing assumes that the permanent magnet is fixed. The variable "i" is the current in the conductor, while L is vector length of the conductor, the direction of which defines the positive sense for current flow. The variable B is the vector defining the direction and magnitude of the magnetic field. If there are N conductors (for example, a coil with N windings) in a uniform magnetic field, then the relationship becomes $F=NiL\times B$. If B varies (for example, with position) the relationship may be interpreted differentially (for example, by integration over the conductor).

Figure 3A:
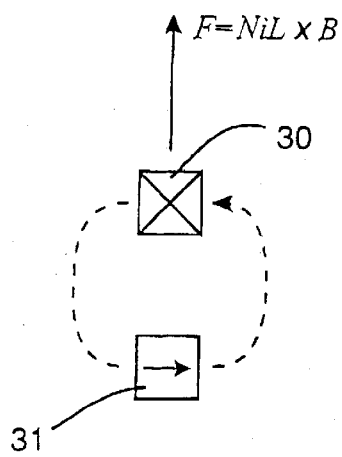
FIGS. 3a, 3b, 3c and 3d each show a schematic representation of an arrangement of a conductor (or conductive coil) and a permanent magnet, to illustrate additional known principles of magnetic interaction.

In FIG. 3a, a force F is imparted on a bundle of N current-carrying conductors 30, when the bundle of conductors 30 is in sufficient proximity to be influenced by the magnetic field of a permanent magnet 31 oriented as shown.

Figure 3B:
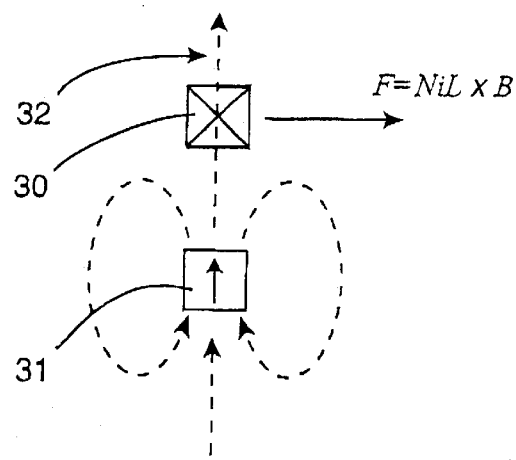
Figure 3C:
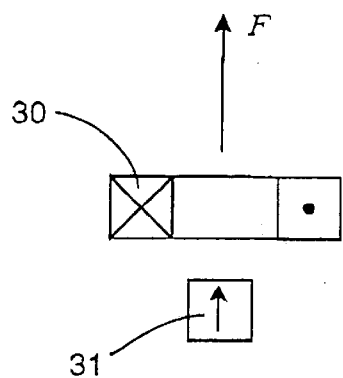
Figure 3D:
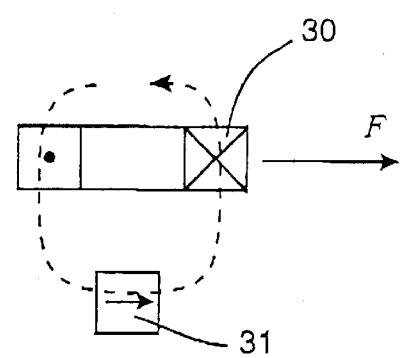

FIG. 3b shows how the direction of force F can be changed by reorienting the magnet 31, so that the magnetic field 32 influencing the conductor is rotated 90 degrees relative to the arrangement in FIG. 3a. In arrangements in which the bundle of N conductors comprises a coil, the representations shown in FIGS. 3a and 3b would include return paths for such coil conductors, as shown in FIGS. 3c and 3d, respectively.

In the context of magnetic levitation for vehicles, configurations have been proposed which employ arrangements of permanent magnets as shown in FIG. 1a for creating lift force and arrangements of electromagnets as shown in FIG. 2a for providing lateral stabilizing forces.

Figure 4:
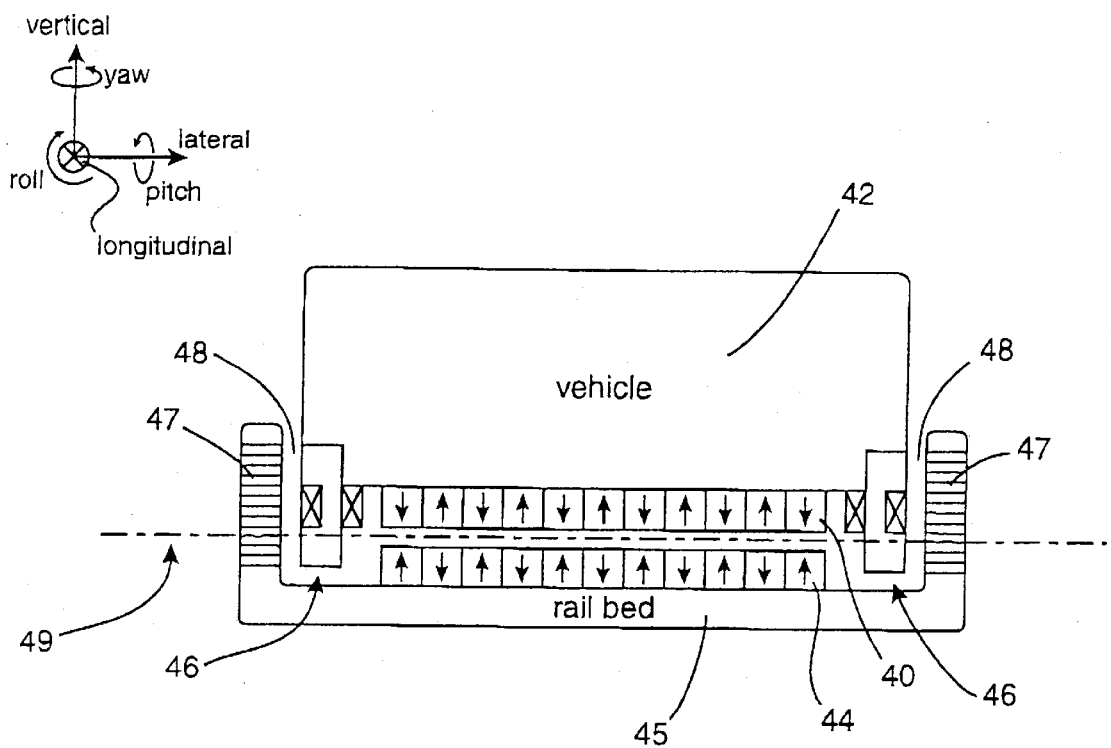
FIG. 4 shows a generalized, cross-sectional view of an example of a conventional magnetically levitated vehicle system.

For example, in FIG. 4, one proposed design employs a first array of permanent magnets 40 attached to a vehicle 42 and a second array of permanent magnets 44 attached to a guideway or rail bed 45. In FIG. 4, the vehicle 42 and the rail bed 45 are shown in a lateral cross-section view. Thus, the rail bed 45 extends in the direction into and out of the page, for guiding the vehicle 42, as the vehicle is propelled in the direction into or out of the page by a suitable propulsion system (not shown). The permanent magnets in each array are arranged such that each magnet in an array has a polar orientation that is directly opposite to the polar orientation of each adjacent magnet in the same array.

The permanent magnets in the first array 40 are arranged with their poles facing the corresponding poles of the permanent magnets in the second array 44. As a result, a repulsive force is created between the two arrays for levitating the vehicle 42 relative to the rail bed 45, in a manner as described above with respect to FIG. 1a.

Because like poles of the permanent magnets in the two arrays repel and opposite poles attract, a natural tendency of the arrays 40 and 44 is to shift laterally relative to each other (either left or right from an unstable equilibrium point), to align opposite poles of the magnets in the two arrays. If such a lateral shift occurred, the N poles of magnets in array 40 would align with and face the S poles of magnets in array 44 and the vehicle 42 would be drawn toward the rail bed 46, rather than lifted off of the rail bed, by the magnet arrays. Accordingly, lateral guidance force on the vehicle is provided by electromagnets 46 that interact with iron rails 47, across gaps 48, in a manner as described above with respect to FIG. 2a.

A magnetically levitated vehicle system employing a configuration as described above with respect to FIG. 4 is disclosed in further detail in U.S. Pat. No. 5,601,029 to Geraghty et al. However, in such configurations, a substantial amount of magnetic field energy goes unused and, thus, is wasted. In particular, the alternating magnetization patterns of the arrays 40 and 44 in such configurations creates a symmetric field above and below each array. However, for each array 40 and 44, only the field on the side that faces the other array is employed to provide the lift force. Thus, for a given volume and weight of magnetic material used in the arrays 40 and 44, the creation of usable magnetic field energy is relatively inefficient.

Another drawback of the configuration of FIG. 4 is that of roll stiffiess about the longitudinal axis indicated in the coordinate frame of FIG. 4 (i.e., an axis lateral to the lengthwise direction of the guideway). The magnets located nearer to the centers of the arrays create lift force, when interacting with the guideway magnets. However, these centrally located magnets contribute little to roll stiffness, due to their relatively short moment arms. Moreover, the configuration in FIG. 4 can be relatively complex in that it requires both horizontal and vertical active surfaces. The active surface of iron rails 47 are vertical and supported in a cantilevered fashion relative to the rail bed 45. As the vehicle 42 makes turns, substantial turning loads can be transferred to the vertical active surfaces, thus, requiring a relatively robust and costly guideway or rail bed structure.

Embodiments of the present invention can avoid the need for such costly vertical support structures, for example, by transmitting turning loads along a shorter path to the guideway surface directly below the vehicle. Further embodiments employ efficient Halbach arrays that produce a greater lift force for the same volume of magnetic material employed in arrays 40 and 44 of alternating N-S facing magnets. Yet further embodiments reduce or obviate roll stiffness problems, by locating magnet arrays that provide lift forces toward the left and right sides of the vehicle, relative to magnet arrays located toward the center of the vehicle.

As described in further detail below, embodiments employ unique arrangements of one or more permanent magnet and one or more electromagnet on the vehicle that interact with one or more permanent magnet arrays on the guideway for providing levitation and lateral control forces. The permanent magnet(s) on the vehicle may interact with the guideway array(s) to provide (or contribute to) levitation of the vehicle. The electromagnet(s) on the vehicle may interact with the guideway array(s) to provide lateral stability forces, for example, using Lorentz force principles. In further embodiments, the electromagnets may also provide (or contribute to) levitation or vertical damping forces on the vehicle. Various different arrangements and configurations of permanent magnets (and magnet arrays) and electromagnets are employed in various corresponding embodiments of the invention. Representative embodiments of suitable magnet and electromagnet arrangements and configurations are described herein as illustrative examples. However, one skilled in the art will understand that other suitable arrangements and configurations of magnets and electromagnets may be employed within the scope of further embodiments of the invention.

Figure 5:
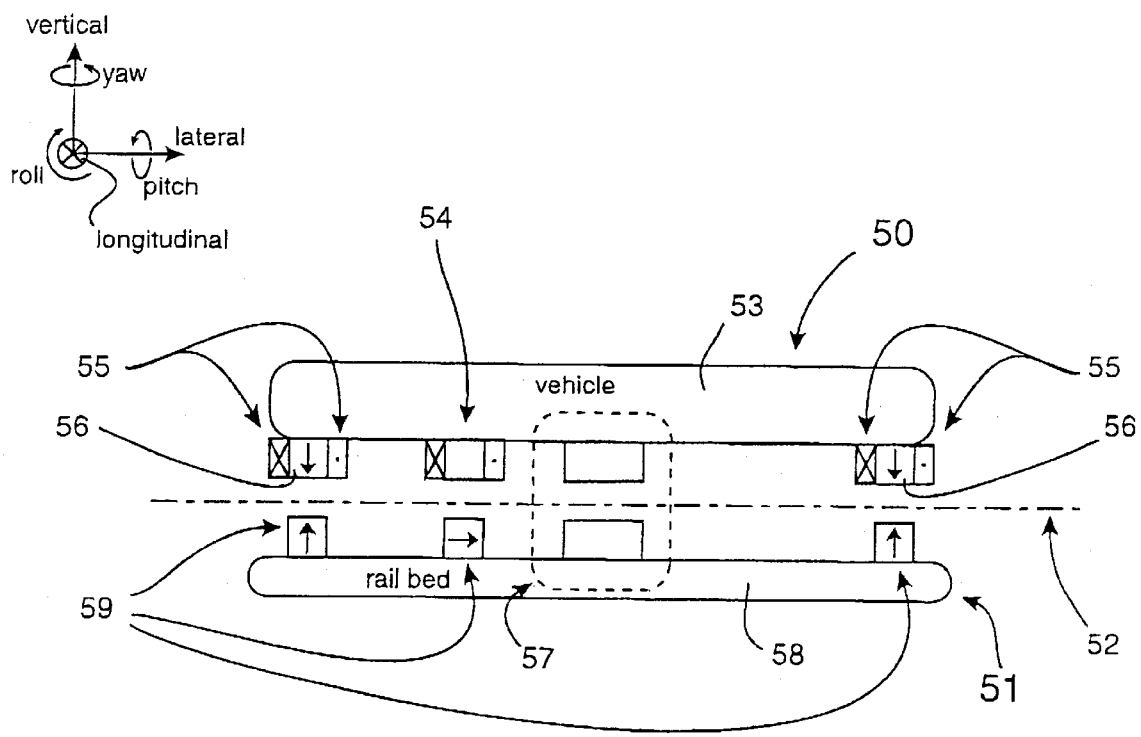
FIG. 5 is a generalized cross-sectional view of a magnetically levitated vehicle system according to an example embodiment of the present invention.

A generalized representation of an example embodiment of the invention is shown in FIG. 5, wherein a vehicle 50 (shown in a lateral cross-section) is supported by magnetic levitation above a guideway 51. In the illustration in FIG. 5, the guideway 51 extends in the direction into and out of the page, in a manner similar to the orientation of the rail bed in FIG. 4. The guideway 51 need not include, and preferably does not include, complex or costly vertical active surfaces as described above with respect to the rail bed of FIG. 4. Thus, the guideway 51 may be configured such that, when the vehicle 50 is in a levitated state, a section line 52 defining a separating plane that can separate the vehicle magnetic elements and the guideway magnetic elements, without passing through any portion of the magnetic elements of either the vehicle or the guideway. The section line 52 in FIG. 5 is compared to the section line 49 in FIG. 4, which passes through a portion of the vehicle structure and the rail bed structure. In some embodiments, additional non-magnetic structures may intersect the separating plane, such as mechanical, lateral stops or a tube surrounding the rails.

The vehicle 50 in FIG. 5 includes a vehicle body 53, a lateral control coil 54, vertical control coils 55, levitation magnets 56 and a part of a propulsion subsystem 57 (for example, but not limited to, a linear motor as described above). The guideway 51 in FIG. 5 includes a rail bed or similar structure 58, guideway magnet array 59 and a further part of the propulsion subsystem 57. The guideway magnet array 59 includes a plurality (three in the illustrated embodiment) of magnets in the cross-section view of FIG. 5. Those magnets (or an array of magnets that produce approximately the same magnetic field) may be disposed in a continuous fashion along the length of the guideway (in the direction into and out of the page), to allow continuous interaction with the vehicle magnets and coils, as the vehicle is propelled along the guideway.

In the embodiment of FIG. 5 the interaction of the vehicle magnets 56 and adjacent magnets in the guideway array 59 provides or contributes to the levitation of the vehicle, by providing a repulsive force in a manner as described above with respect to the permanent magnets in FIG. 1a. In addition, vertical control coils 55 on the vehicle 50 may be energized to interact with the adjacent magnet in the guideway array 59 and provide an attractive or repulsive force in a manner as described above with respect to the coil and magnet arrangement of FIG. 3c by modulating the sign and magnitude of the current in the coil. The vertical control coils 55 may be employed primarily to provide a damping force, for example, to conserve energy. However, in further embodiments, the vertical control coils 55 may be employed to provide or contribute to levitation of the vehicle 50. The coil 54 on the vehicle 50 interacts with its adjacent magnet in the guideway array 59 to provide lateral guidance functions, by providing a controllable lateral force in a manner as described above with respect to the coil and magnet arrangement of FIG. 3d.

The embodiment shown in FIG. 5 includes a pair of vertical control coils 55, adjacent the right and left sides of the vehicle cross-section, and a single lateral control coil 54 at a generally central location of the vehicle cross-section, between the pair of vertical control coils 55. However, other embodiments of the invention employ other suitable arrangements of coils and magnets. For example, in further embodiments of the invention, a cross-section of the vehicle 50 may include only one vertical control coil 55 (or more than two vertical control coils 55) and adjacent magnet(s) in the guideway array 59. In yet further embodiments, a cross-section of the vehicle 50 may include a plurality of lateral control coils 54 and adjacent magnets in the guideway array 59.

In the example arrangement shown in FIG. 5, the magnets and control coils for vertical and lateral control are located in a common lateral cross-section of the vehicle. In further embodiments, the components of that arrangement may be located in mutually different lateral cross-sections of the vehicle. Moreover, in preferred embodiments, multiple arrangements of magnets and control coils for vertical and lateral control may be provided at multiple respective cross-sections of the vehicle. For example, fore and aft arrangements of magnets and control coils (of the type shown in FIG. 5 or other suitable arrangement within the scope of the invention) may be provided for controlling pitch, roll and yaw of the vehicle. By employing fore and aft arrangements, differential control of fore and aft vertical control coils may be used to help stabilize or avoid pitching motions of the vehicle. In addition, the left and right vertical control coils may be controlled differentially to produce a vehicle roll motion, for example, to damp roll oscillations and to resist the tendency of the vehicle to roll in curves or turns along the guideway. As shown in FIG. 5, left and right vertical control coils 55 may be located toward (or, more preferably, adjacent) the right and left respective sides of the vehicle, to provide a more effective control of vehicle roll motions.

Thus, vertical control coils may be employed to control pitch, roll, and overall vertical motion of the vehicle (generally referred to herein as vertical control). Fore and aft lateral control coils may be controlled differentially to control yaw and lateral motion of the vehicle (generally referred to herein as lateral control).

Further aspects of the invention are described with respect to the example embodiment shown in FIGS. 6a through 6d. Where applicable, aspects of the embodiment described above with respect to FIG. 5 may be employed in connection with the embodiment of FIG. 6. Similarly, aspects of the embodiment of FIG. 6 may be employed in connection with the embodiment of FIG. 5 described above.

Figure 6A:
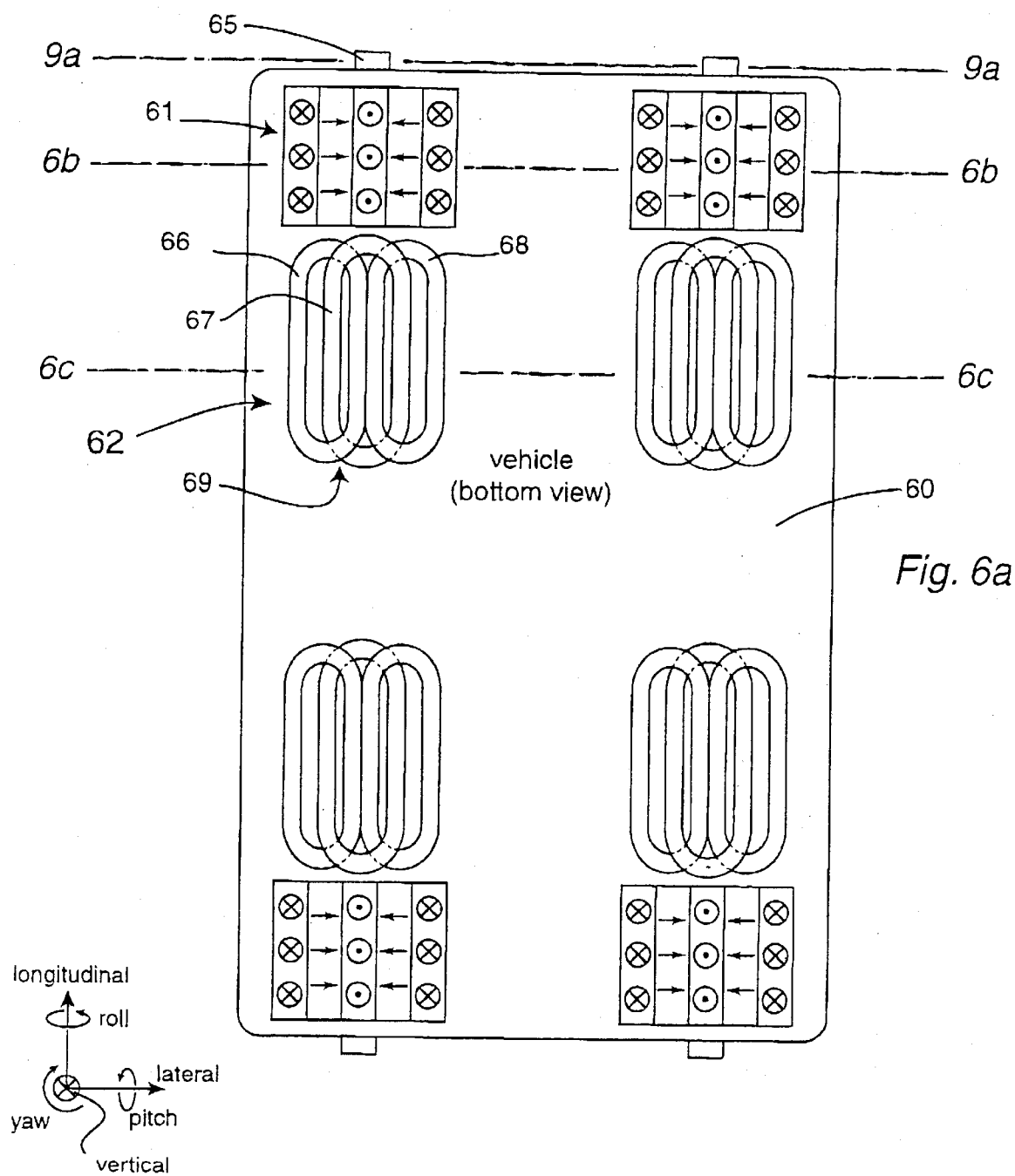
FIG. 6a is a generalized bottom view of a vehicle for a magnetically levitated vehicle system according to a further example embodiment of the present invention.

In FIG. 6a, a generalized representation of a bottom view of a vehicle 60 according to a further example embodiment of the invention is shown. The vehicle in FIG. 6a includes four magnet arrays 61 and four coil arrays 62, arranged adjacent or toward four respective corners of the vehicle, such that each corner of the vehicle is associated with a respective magnet array 61 and coil array 62. In other embodiments, other suitable arrangements and locations of magnet arrays 61 and coil arrays 62 may be employed. For example, multiple magnet arrays 61 and/or coil arrays 62 may be associated with some or each of the vehicle corners. Alternatively, or in addition, one or more magnet arrays and/or coil arrays may be more centrally located on the vehicle 60.

Figure 6B:
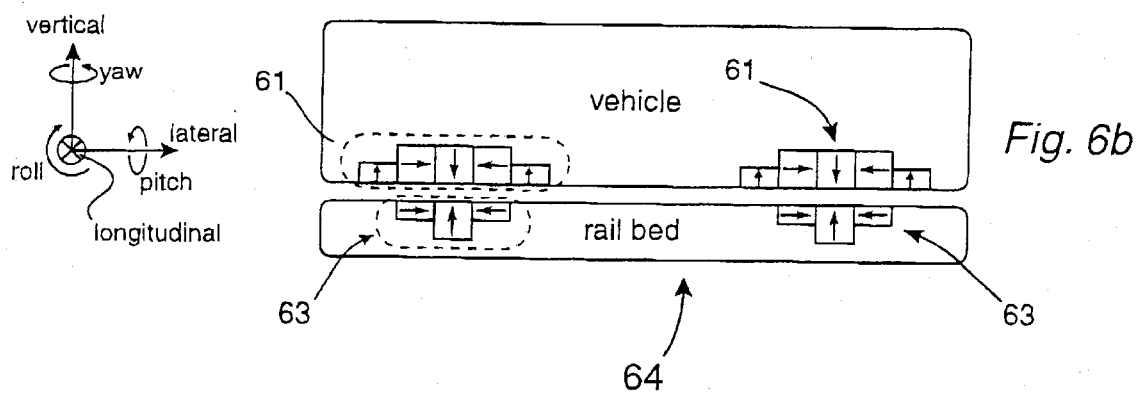
FIG. 6b is a generalized cross-sectional view of the vehicle of FIG. 6a, taken along line 6b—6b of FIG. 6a and shown levitated relative to a guideway.

The four magnet arrays 61 in the FIG. 6a embodiment are arranged to align and interact with corresponding magnet arrays 63 on a guideway 64, as shown in FIG. 6b. In the illustration in FIG. 6b, the guideway 64 extends in the direction into and out of the page, in a manner similar to the orientation of the rail bed in FIG. 4 and the guideway in FIG. 5. Thus, the magnet arrays 63 shown in the cross-section view of FIG. 6b, extend along the length of the guideway in a continuous fashion, as described above with respect to guideway magnet array 59 in FIG. 5. Furthermore, while the illustrated embodiment includes two magnet arrays 63 (or two sub-arrays of a guideway array), other embodiments may employ a single array or more than two arrays, depending upon the arrangement of magnets 61 and electromagnet coils 62 on the vehicle that interact with the arrays 63.

In the illustrated embodiment, each magnet array 61 and 63 comprises a plurality of magnets arranged with rotating magnetization, in that the direction of magnetization of each magnet is rotated ninety degrees relative to each directly adjacent magnet in the same array. This rotation serves to focus the array field toward the active surface (the active surface of 61 faces 63 and visa versa) at the expense of the unused surface opposite to the active surface. In preferred embodiments, the direction of rotation is counterclockwise when viewed from left to right, with the active surface facing upward, where the active surface is the surface that faces interacting magnets or coils during levitation. Such a rotation, as known in the field of Halbach array design, may be used to concentrate the magnetic field on one side of the array, at the expense of the field intensity on the other side of the array. In further preferred embodiments, the magnet arrays 61 (and 63) comprise Halbach arrays, having a plurality of discrete magnetization vector directions.

In the illustrated example, each Halbach array 61 on the vehicle 60 includes five permanent magnets, where each magnet has a direction of polarity rotated 90 degrees relative to the direction of polarity of each adjacent magnet in the array. The arrays 63 on the guideway 64 in the illustrated example, each include three permanent magnets in the cross-section view. Each magnet of the array aligns with (and has a direction of polarity that mirrors that of) a corresponding one of the central three magnets of the array 61. In other embodiments, arrays with greater or fewer magnets may be employed. In preferred embodiments, the guideway arrays 63 may comprise Halbach arrays having four or more distinct magnetization vector directions.

The four coil arrays 62 in the FIG. 6a embodiment are also arranged to align and interact with the magnet arrays 63 on the guideway 64. In the illustrated embodiment, each coil array 62 includes three coils 66, 67 and 68. The central coil 67 in the array functions as a vertical control coil, while the coils 66 and 68 at the sides of the array function as lateral control coils by creating lateral forces. The four coil arrays 62 may be controlled independently to effect vertical, lateral, pitch, roll and yaw motions of the vehicle, in accordance with the principles described above.

In an example embodiment, the coils 66, 67 and 68 in each given array are generally in the same plane, although the coils must cross each other in end-turn locations such as 69. Since the end turns do not play a significant role in actuation, the ends can be folded up into the vehicle body. The routing of end turns is well known within in the field of electromagnetic actuator design including motor design.

The section lines 9a, 6b, and 6c that are shown in FIG. 6a, correspond to figures with the same numbers respectively. In FIG. 6b, the vehicle 60 and guideway 62 are shown in a generalized, cross-section view, taken along section line 6b—6b of FIG. 6a. When the vehicle 60 is disposed on the guideway 64, the magnet arrays 61 on the vehicle interact with the magnet arrays 63 on the guideway, to produce a repulsive force for levitating (or contributing to the levitation of) the vehicle 60 relative to the guideway 64. In the illustrated embodiment, the magnet arrays 63 on the guideway are Halbach arrays and have a magnetization pattern that mirrors the magnetization pattern of the arrays 61. The arrays 63 may have the same number of magnets as the arrays 61.

In preferred embodiments, the dimension of the magnets in arrays 61 and 63 may be optimized to minimize magnet weight and cost. The magnet arrays may also be dimensioned so as to be thicker in the centers and thinner at outer edges (e.g., cup shaped), wherein larger, more powerful magnets are located in central regions of the arrays.

According to another aspect of the invention, the size of the magnets in the magnet arrays 61 on the vehicle may be increased to allow a corresponding reduction in the size of the magnets in the guideway magnet arrays 63, without loss of levitation force. The reduction in the size of the magnets in the guideway magnet arrays 63 would likely have an overall cost savings effect, in practical transportation systems in which the length the guideway is considerably longer than the combined length of all vehicles operating in the system.

Figure 6C:
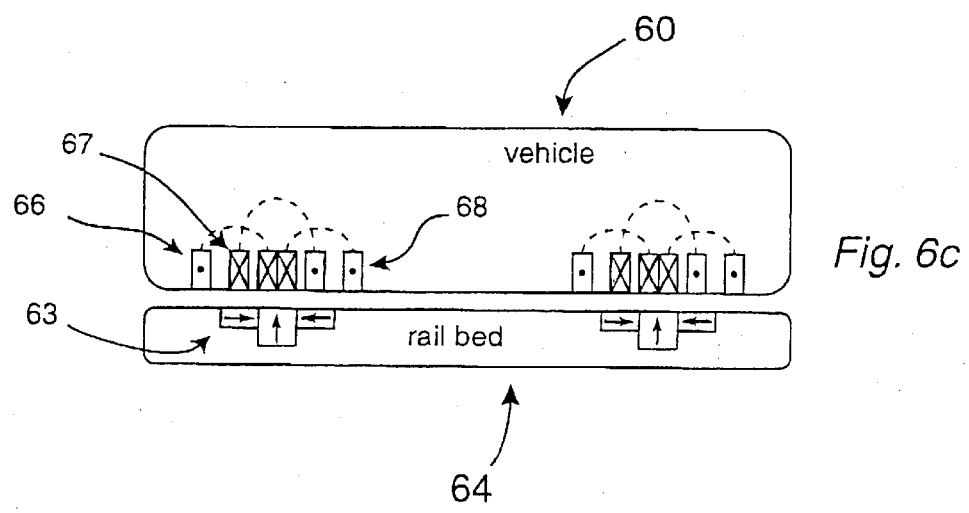
FIG. 6c is a generalized cross-sectional view of the vehicle of FIG. 6a, taken along line 6c—6c of FIG. 6a and shown levitated relative to a guideway.

In FIG. 6c, the vehicle 60 and guideway 64 are shown in a generalized, cross-section view, taken along section line 6c—6c of FIG. 6a. A dotted curved line is added in the drawing as a reminder that there are end turns out of the plane of the section view. Lateral control coils 66 and 68 and vertical control coil 67 are depicted in a similar fashion, using the cross and dot notation.

The lateral control coils 66 and 68 may operate in accordance with the general principles described above with respect to FIG. 3d to produce lateral control forces. The vertical control coils 67 may operate in accordance with the general principles described above with respect to FIG. 3c to produce vertical forces on the vehicle. In each coil array 62, the lateral control coils 66 and 68 are immersed in a largely vertical magnetic field from the guideway array 63, while the vertical control coil 67 is immersed in a largely horizontal magnetic field from the guideway array 63. In one embodiment, the lateral control coils 66 and 68 are driven in unison with the same current (both in sign and magnitude) to produce a resulting lateral force. In other embodiments, the control coils may be individually controlled.

In a practical operating environment, the lateral forces and vertical forces produced by the control coil actuators can vary from the ideal directions. For example, this phenomenon may result from variations in the levitation position relative to nominal or imperfections in the magnets and coils. Some variations may be tolerable, and larger variations may be compensated. In almost all cases the force directions of the vertical coil and the lateral coil set span a two dimensional space. Thus, for any position of the vehicle, it is possible to solve for the coil currents that provide the desired force. Those skilled in the art of multi-variable control system design are familiar with such compensation schemes.

Figure 6D:
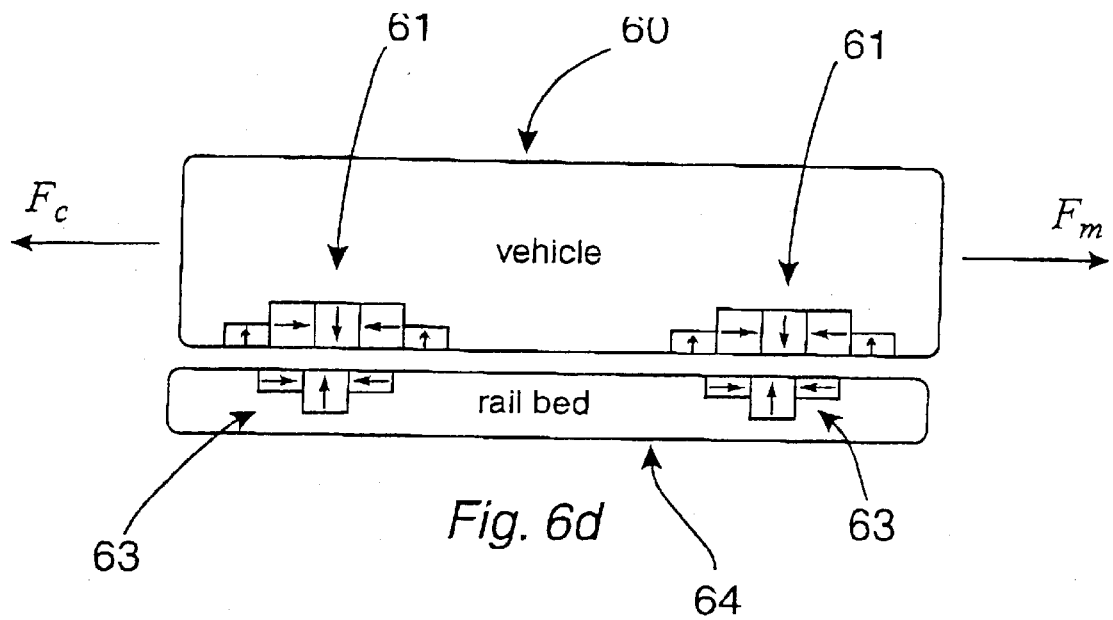
FIG. 6d is a generalized cross-sectional view of the vehicle and guideway of FIG. 6b, when the vehicle is in a turn or curve along the guideway.

In FIG. 6d, an example is shown of a desired configuration of the vehicle 60 relative to the guideway 64, during a turn or curve along the guideway 64. As shown in the drawing, the magnets in the two arrays 61 and 63 can become misaligned in the turn or curve. The system may produce a stiffniess effect on the vehicle 60, wherein small motions of the vehicle result in changes in magnetic forces. Thus, if the vehicle 60 is pushed downward toward the guideway 64, the magnet arrays 61 and 63 interact to produce a restoring force. However, if the vehicle is displaced laterally, the magnet arrays interact to produce a destabilizing force. Thus, the system may produce a positive stiffness in the vertical direction similar to what is found in a common spring, and a negative stiffness in the lateral direction. In accordance with Earnshaw's theorem, these stiffiesses add to zero.

Thus, in an example embodiment, the lateral coils may be employed to maintain stability (to address the destabilizing force that can be created by misaligned magnet arrays), while the vertical control coils may be used, primarily for damping. In other embodiments, the vertical control coils may also be employed to provide or contribute to vehicle levitation. In a turn or curve along the guideway 64, it is desirable for the centrifugal forces shown as $F_c$ in FIG. 6d to be cancelled by permanent magnet forces, to conserve power in the control coils. If the vehicle is controlled to move to the inside of a turn as shown in FIG. 6d, passive magnetic forces $F_m$ can cancel the centrifugal force. Control schemes that accomplish this are well known in the art of magnetic bearing control and are referred to as virtual zero power controllers. One example of such a control scheme is described in U.S. Pat. No. 3,860,300 issued to Lyman, the description of which is incorporated herein by reference.

Figure 7:
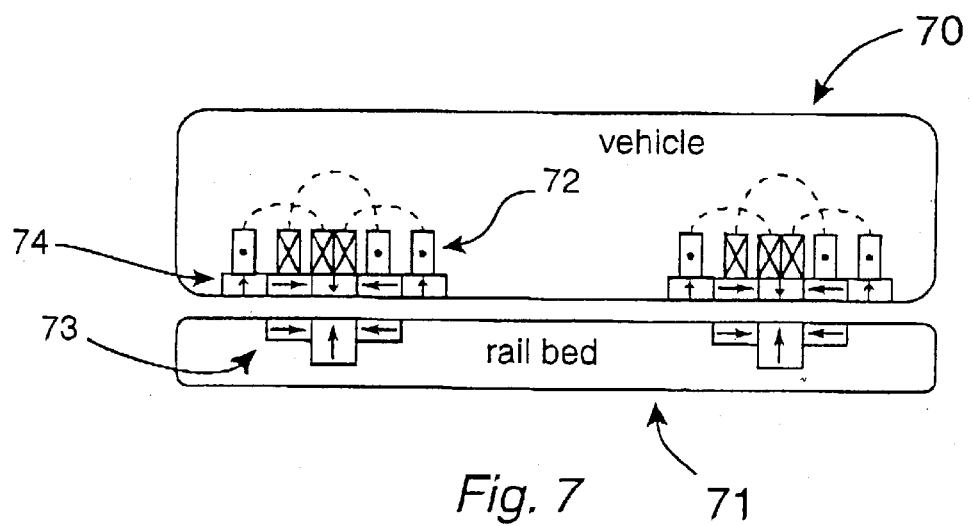
FIG. 7 is a generalized cross-sectional view of a vehicle and guideway according to a further embodiment of the present invention.

A magnetically levitated vehicle and guideway system according to another embodiment of the present invention is shown in FIG. 7. The cross-section view of a vehicle 70 and guideway 71 of FIG. 7 is taken along a line similar to the cross-section line 6b—6b of vehicle 60 in FIG. 6a. However, unlike the embodiment of FIGS. 6a and 6b, the embodiment shown in FIG. 7 employs control coil sub-arrays 72 that are positioned on top of a magnet array 74 on the vehicle 70. The magnet array 74 may be configured to have a shortened vertical form factor (as compared to the magnet array 61 shown in FIG. 6b or 6d), so that the control coils 72 are located closer to the guideway magnet array 73 and operate in reasonably high magnetic fields.

In the illustration in FIG. 7, the guideway 71 extends in the direction into and out of the page, in a manner similar to the orientation of the guideway 64 in FIG. 6b. Thus, the magnet arrays 73 shown in the cross-section view of FIG. 7, extend along the length of the guideway in a continuous fashion, as described above with respect to guideway magnet array 63 in FIG. 6b. Furthermore, while the illustrated embodiment includes two magnet arrays 73 (or two sub-arrays of a guideway array), other embodiments may employ a single array or more than two arrays, depending upon the arrangement of vehicle magnets 74 and electromagnet coils 72 that interact with the arrays 73. An alternative embodiment relative to that of FIG. 7 includes the coils and magnet arrays 74 interchanged in position, such that the coils are between the arrays 74 and 73, when the vehicle is arranged for levitation relative to the guideway. An advantage of this alternative embodiment is that the coils operate more efficiently in a higher magnetic field. However, in the alternative embodiment, larger magnet arrays 74 may be needed to provide the same lift force as the illustrated embodiment.

Numerous configurations of magnets and coils may be employed to achieve the objective of stable levitation. Thus, other embodiments of the present invention may employ other suitable magnet and coil arrangements for providing the levitation and control functions described herein. In preferred embodiments, permanent magnets support the weight of the vehicle and control currents can be applied to control coils to affect forces and torque to stabilize vertical, lateral, pitch, roll, and yaw motions. Vertical, pitch, and roll motions can be controlled with damping alone, such that shorted control coils or conductive sheets may be used for vertical control.

Figure 8A:
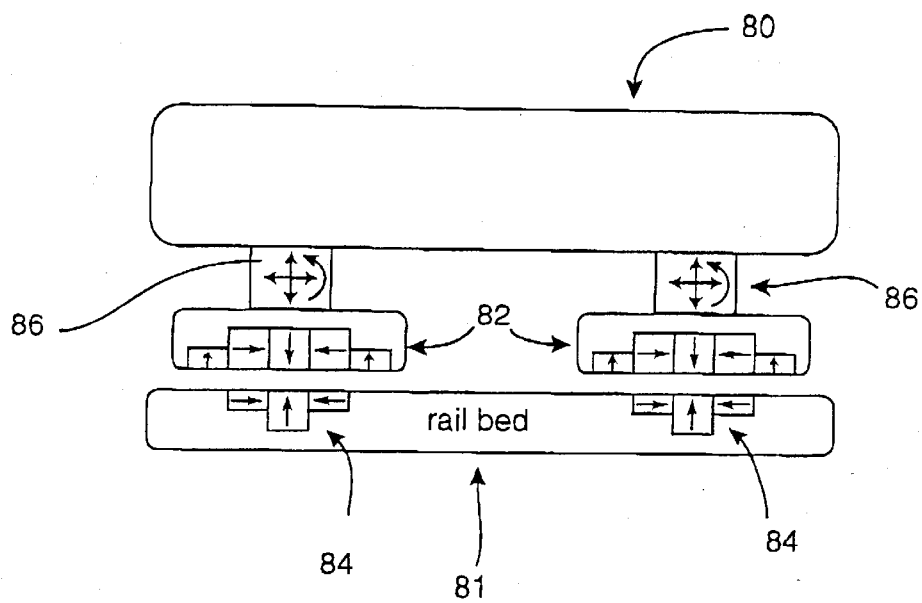
FIG. 8a is a generalized cross-sectional view of a vehicle and guideway according to yet a further embodiment of the present invention.

In further embodiments, in addition to using current carrying coils, the magnetic field produced by the vehicle may be controlled by physically moving or rotating one or more magnet arrays. For example, in the embodiment of FIG. 8a, a vehicle 80 is levitated relative to a guideway 81 with the use of one or more (two in the illustrated example)

magnet arrays 82 on the vehicle that interact with one or more (two in the illustrated example) magnet arrays 84 on the guideway, similar to the manner of levitation described above with respect to FIG. 6b. However, unlike FIG. 6b, the vehicle magnet arrays 82 in FIG. 8a are moveable and supported on single or multi-degree-of-freedom motors or actuators 86 that may be controlled to move the arrays 82 vertically, laterally and/or rotatably to rotate the arrays into a sloped position over the rails, to control the lateral position of the vehicle and to dampen vertical motion. In a further embodiment shown in FIG. 8b, magnet arrays 88 have three independently controlled rotary magnets that are supported for rotation to modulate both the vertical and lateral forces. Suitable motors or actuators may be employed to rotate the magnets in the array 88.

Figure 8B:
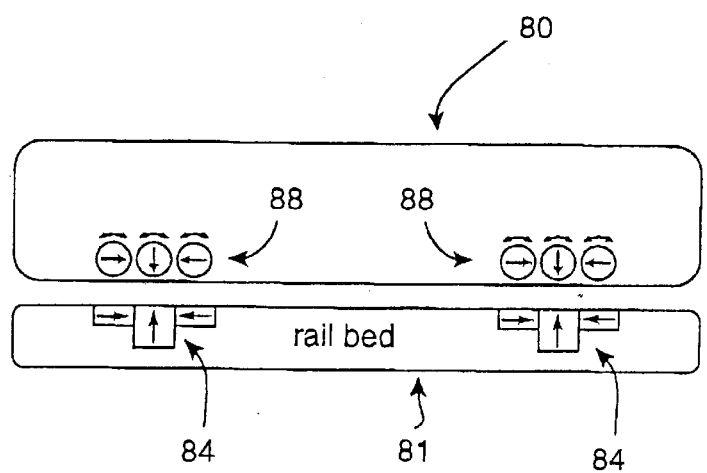
FIG. 8b is a generalized cross-sectional view of a vehicle and guideway according to yet a further embodiment of the present invention.

Magnetically levitated vehicles, according to embodiments of the present invention, may include suitable control electronics to control the current in the vertical and lateral control coils (as well as the actuators or motors described with reference to FIGS. 8a and 8b) The vehicle control electronics may include or operate with sensors for sensing conditions that require (or are expected to require) vertical or lateral control, and a processor (or other suitable electronics) programmed or configured to respond to such sensors by controlling the energization of the coils.

Figure 9A:
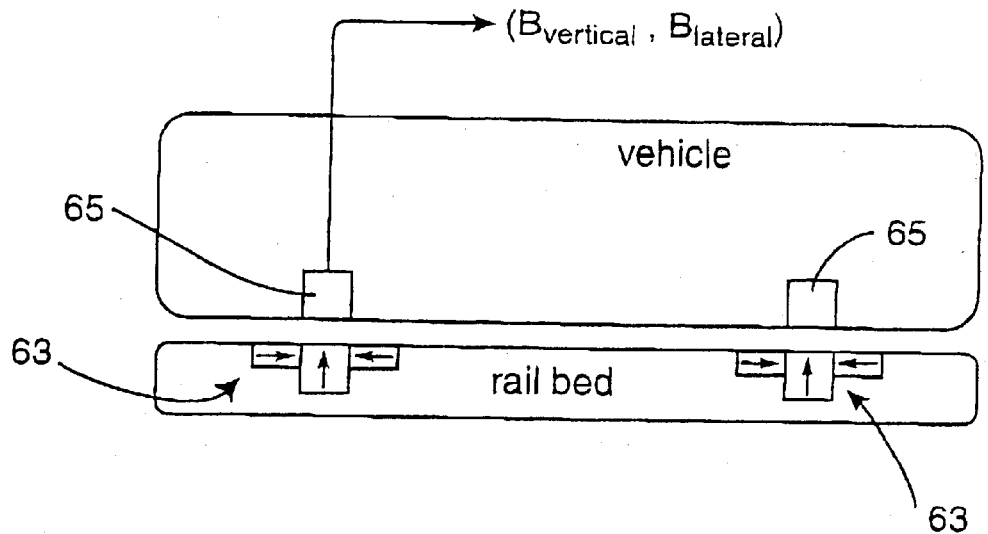
FIG. 9a is a generalized cross-sectional view of the vehicle of FIG. 6a, taken along line 9a—9a of FIG. 6a and shown levitated relative to a guideway.

As shown in FIG. 6a, sensors 65 may be provided on the vehicle 60. In FIG. 9a, a cross-section view of the vehicle 60 is shown, where the cross-section is taken along section line 9a—9a in FIG. 6a. In the illustrated embodiment, the sensors 65 are located in a position over the guideway array 63, to sense the lateral and vertical motion of the vehicle relative to the position of guideway array 63, as the vehicle moves along the guideway. Embodiments of the invention may employ various types of sensors, including, but not limited to, sensors that employ optical, magnetic or electromagnetic radiation to detect the relative position of the guideway or guideway array 63.

In one representative example, the system employs a two-output Hall-effect sensor that measures the vertical and lateral magnetic field at a location over the guideway array 63. The system also includes a processor (or other suitable electronics) programmed or configured to determine the vertical and lateral position of the sensor relative to the guideway array 63, based on the sensor output. In preferred embodiments, a suitable distance or magnetic insulation is provided between the sensors and the control coils, to avoid interference of the sensor by the control coils (as Hall-effect sensors and control coils may operate in the same frequency range).

Figure 9B:
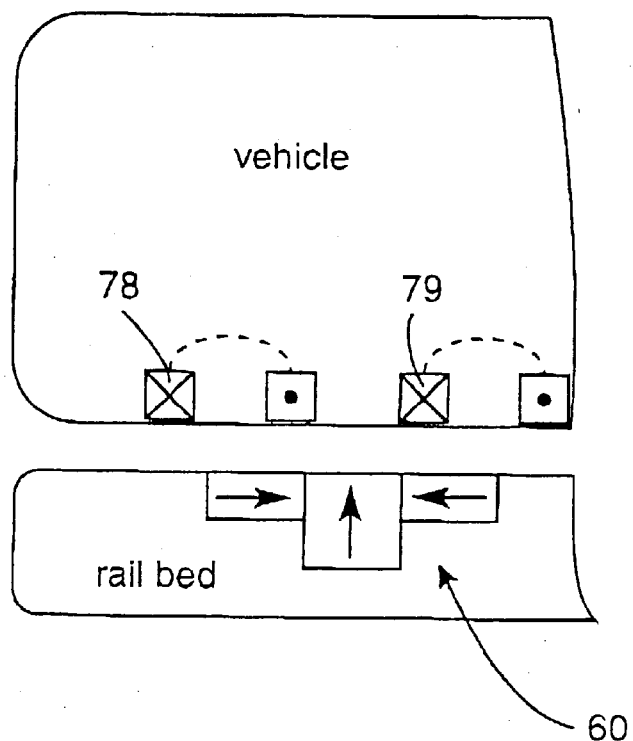
FIG. 9b is a generalized, sectional view of a vehicle and guideway employing an eddy-current sensor for sensing lateral and vertical positions of the vehicle relative to the guideway.

An alternative sensing scheme is shown in FIG. 9b, where eddy-current sensor coils 78 and 79 are used to measure the position of the vehicle relative to the guideway rails. Since many permanent magnet alloys are conductive, the impedance of these coils at a few hundred kilohertz changes with position. An advantage of using eddy-current coils is that they operate in a different frequency range than the control coils and, thus, interference is more easily avoided. In addition, eddy-current sensors are known to be robust sensors in industrial environments.

Figure 10:
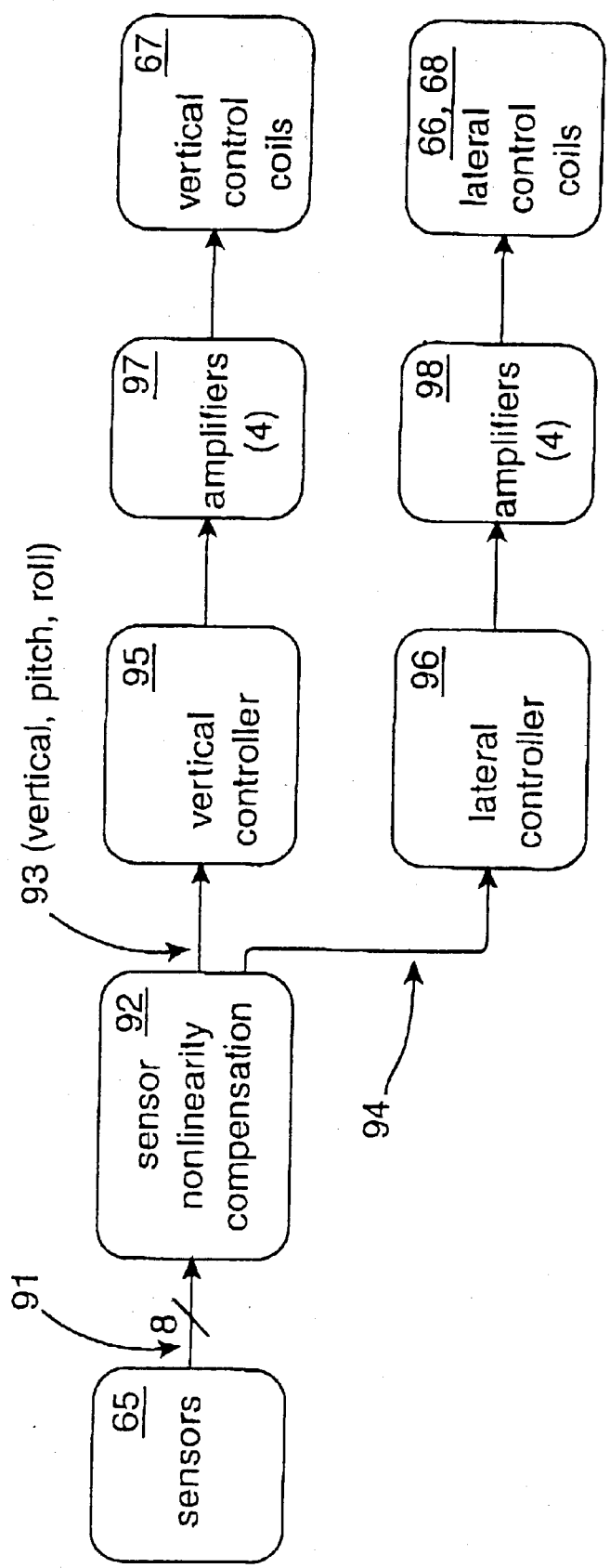
FIG. 10 is a block diagram representation of a feedback control system for a levitated vehicle system.

An example of a control system for use with embodiments (for example of FIGS. 6a–6d) of the invention is shown in FIG. 10. Other embodiments may employ other suitable control system configurations. Various methods may be used to design a suitable control system. For example, multivariable control methods such as H-infinity or H-2 can be used, provided design weights are chosen to accomplish low gain near DC (as is typical in virtual zero power control of lateral motion, and damping control of vertical motion). So-called feedback linearization can be used to compensate for sensor or actuator nonlinearities or look-up tables for the sensors and actuators can be used separately to accomplish linear dynamics for the purposes of control design.

In the representative example of FIG. 10, the four sensors 65 are provided, where each sensor outputs two channels of sensing. As a result, there are a total of eight sensor channels, as shown at 91. A look-up table, algorithm or other suitable means of compensation converts the eight sensor signals into pitch, roll, and overall vertical motion for the vertical controller 95, and into yaw and overall lateral motions for the lateral controller 96. The vertical controller 95 drives four amplifiers 97, which in turn drive the four vertical coils 67, to damp the vertical motions. The lateral controller drives four amplifiers 98 that in turn drive the lateral coils 66 and 68 (connected in series or parallel) to stabilize lateral motions of the vehicle. As noted above, other suitable control strategies may be employed in accordance with other embodiments of the invention. For example, the vertical coil may be replaced by eddy-current damper plates, and control may be accomplished in a decentralized fashion at each corner of the vehicle, as is common in automotive suspensions.

In further embodiments, performance improvements and cost efficiencies are optimized by constraining the total number of discrete magnets in the arrays and minimizing the combined weight of magnets in the vehicle and guideway. An efficiency evaluation should account for the fact that the guideway is not likely to be completely full of vehicles at any point in time. For example, if vehicle magnet arrays occupy only 10% of the length of the guideway, an efficiency calculation may penalize guideway magnet cross section ten times more than vehicle magnet cross section. The cost function for the optimization is, thus, the sum of the cross-sectional areas of the guideway magnet array and vehicle magnet array, weighted accordingly.

In FIGS. 11a–11h, example embodiments configured with the values of the optimization cost functions are shown. Each of the embodiments in FIGS. 11a–11h is configured to produce the same amount of levitation force. In FIGS. 11a–11d, optimized designs are shown, where one tenth of the track is covered with vehicle magnet arrays and the guideway and vehicle arrays have one, two, three and five magnets, each, respectively. As shown in those drawings, the cost function decreases dramatically as the allowable number of magnets is increased from one to three. Thereafter, the benefit of adding additional magnets in an array tends to decrease. In some embodiments, a trade-off between the cost of magnet material and the complexity of structure may lead to a choice of five magnets in one array.

Figure 11A:
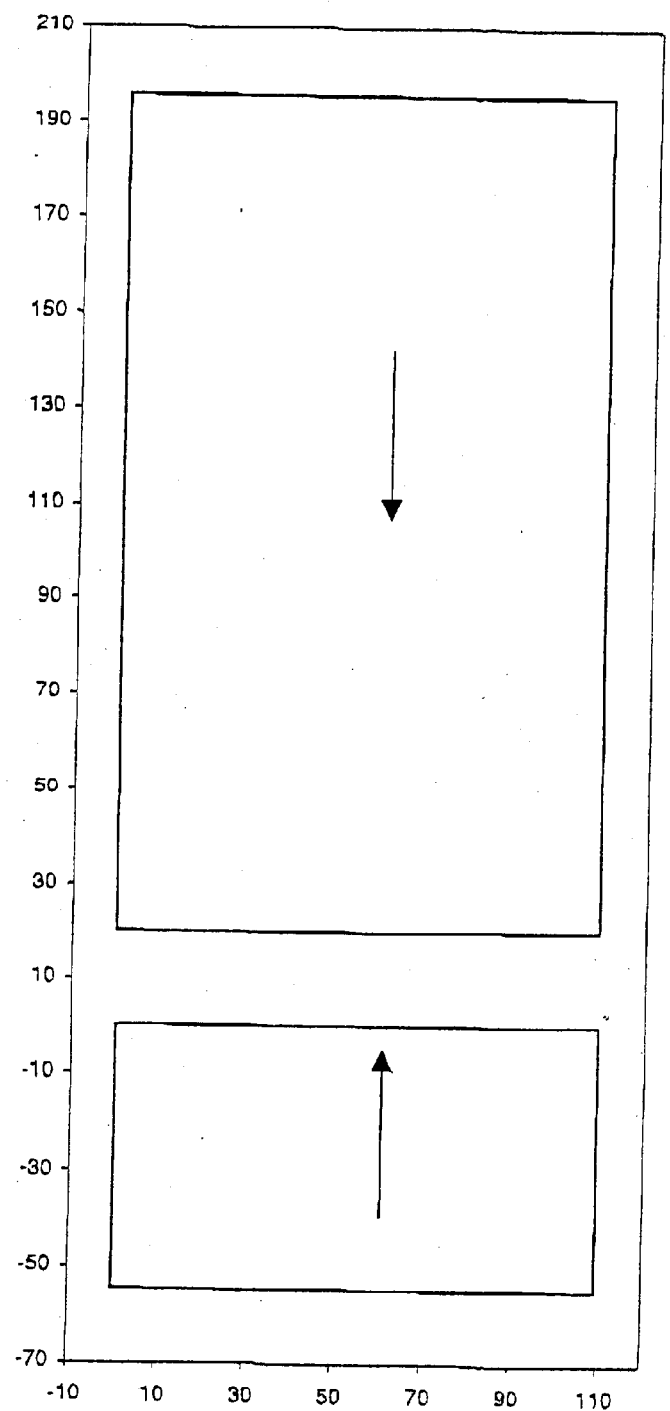
FIGS. 11a–11h are generalized cross-sectional views of example vehicle magnet array and guideway array geometries according to embodiments of the present invention.
Figure 11B:
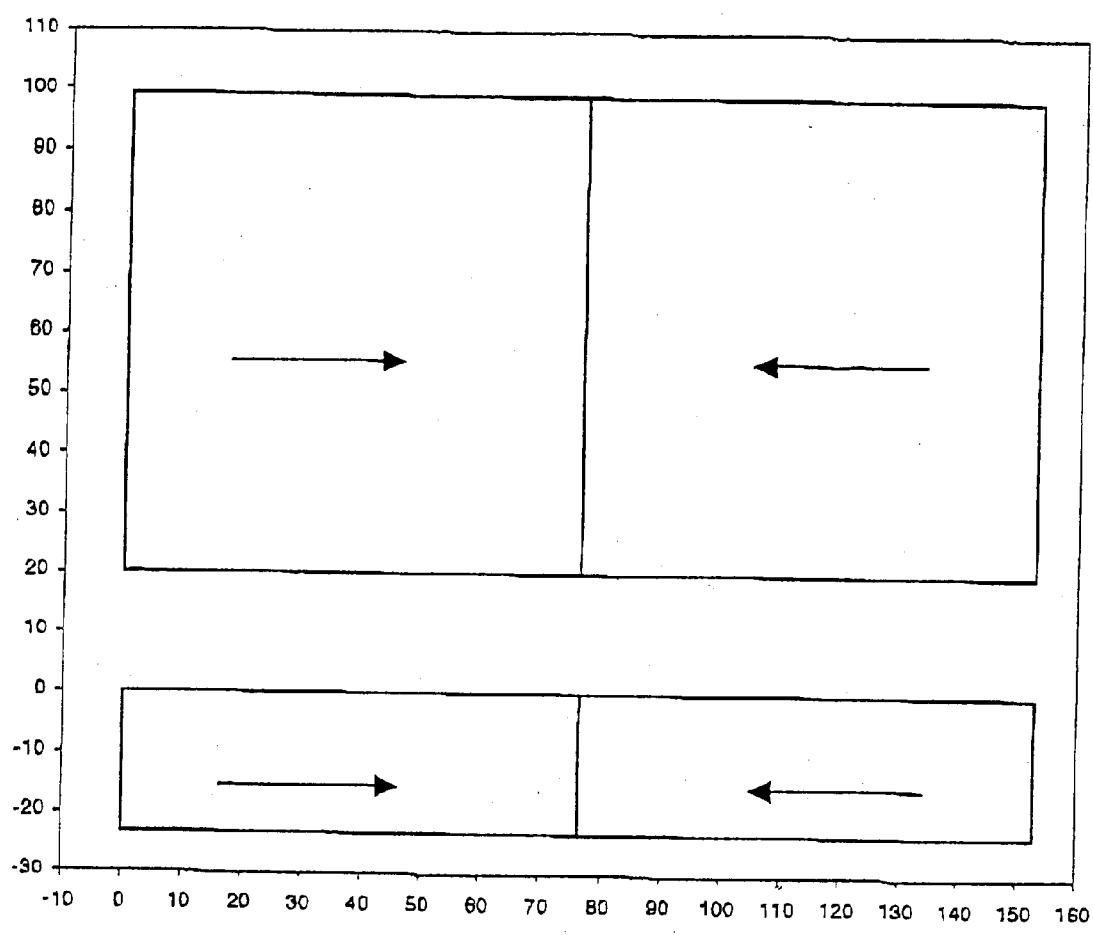
Figure 11C:
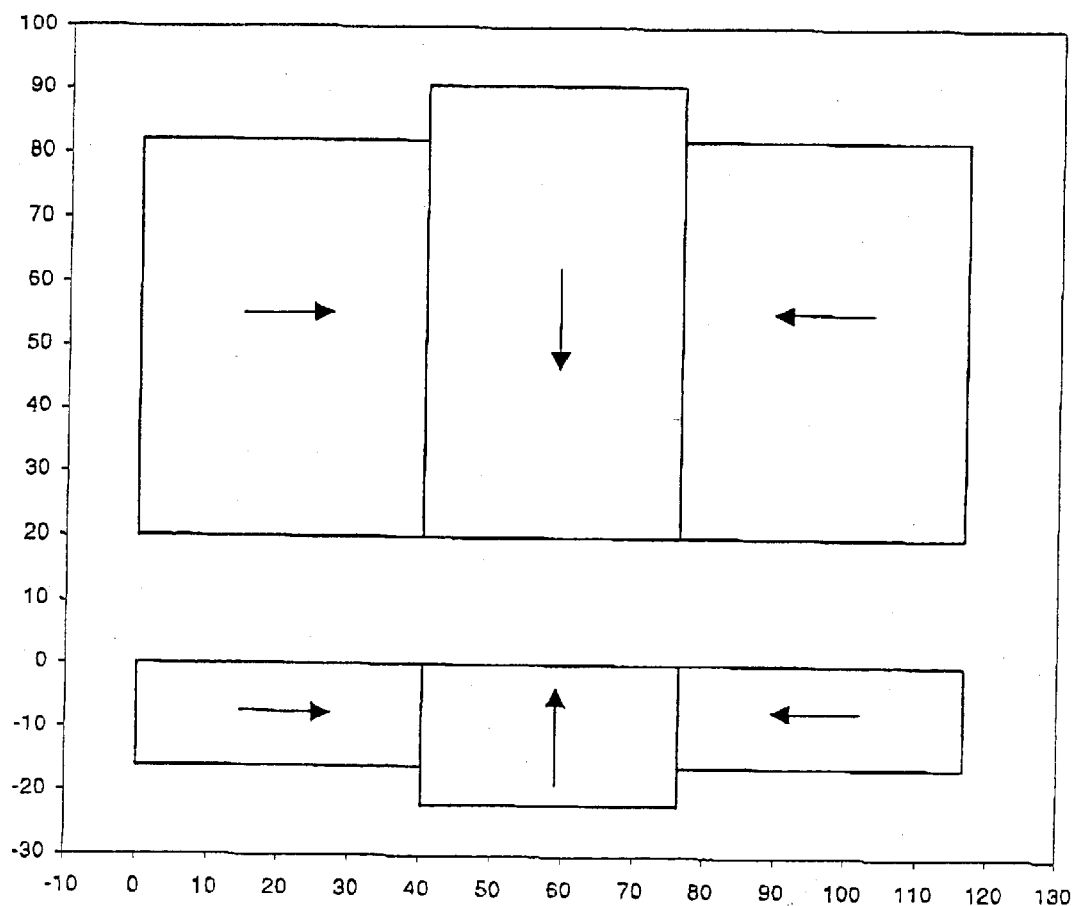
Figure 11D:
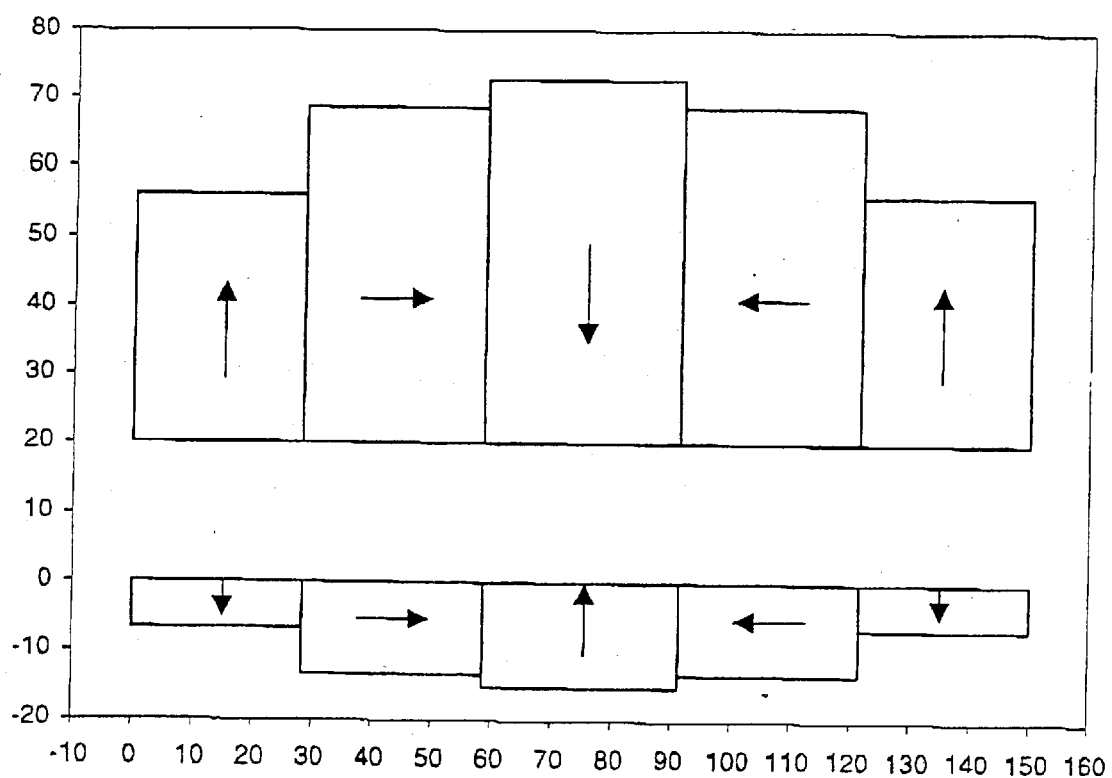
Figure 11E:
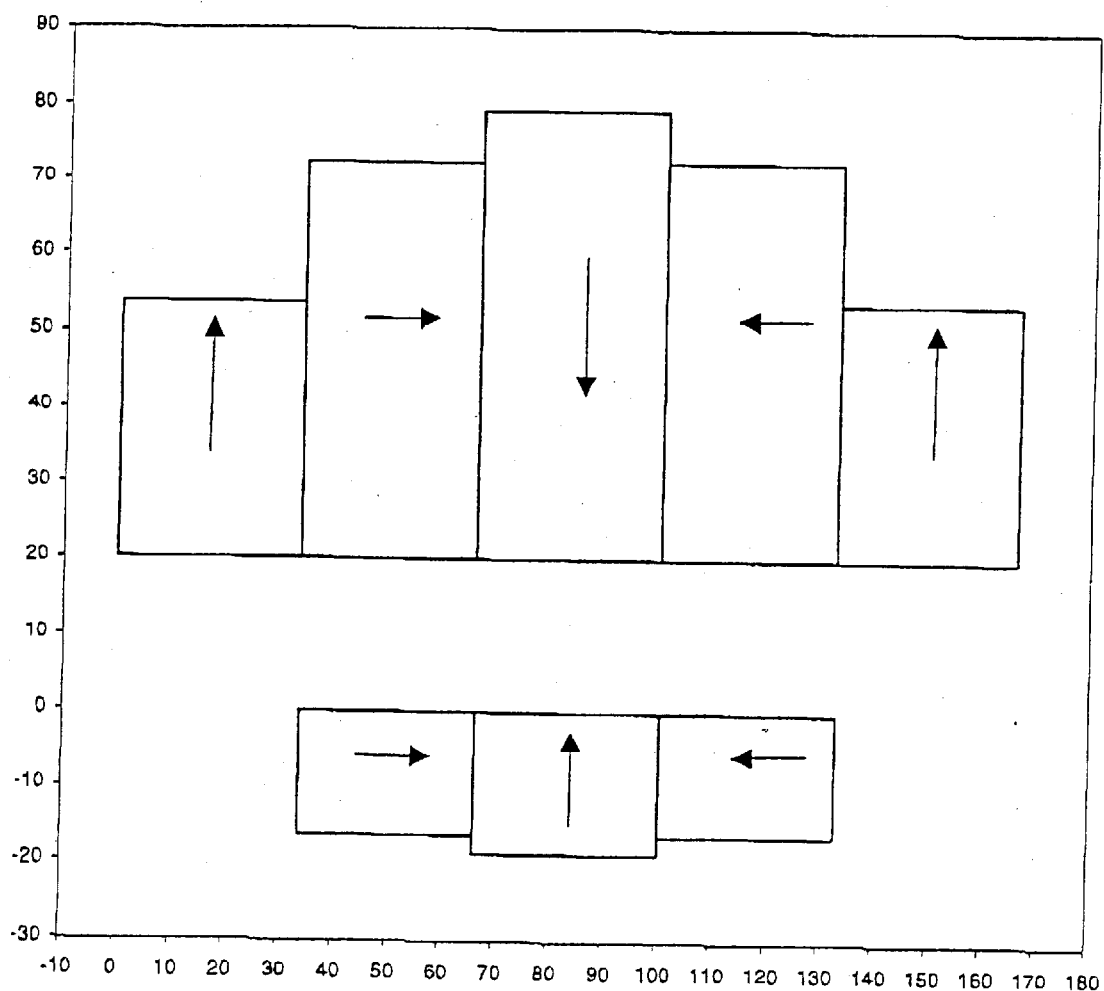

If both the outer two magnets in the five magnet guideway array in FIG. 11d are removed and the magnet dimensions are optimized, then there is only a slight increase in the cost function and the structure becomes the simpler embodiment of FIG. 11e. As a result, embodiments of the invention may employ a different number of magnets in the vehicle array as compared to the guideway array (for example five magnets in the vehicle array and three magnets in the guideway array, as shown in FIG. 11e).

Figure 11F:
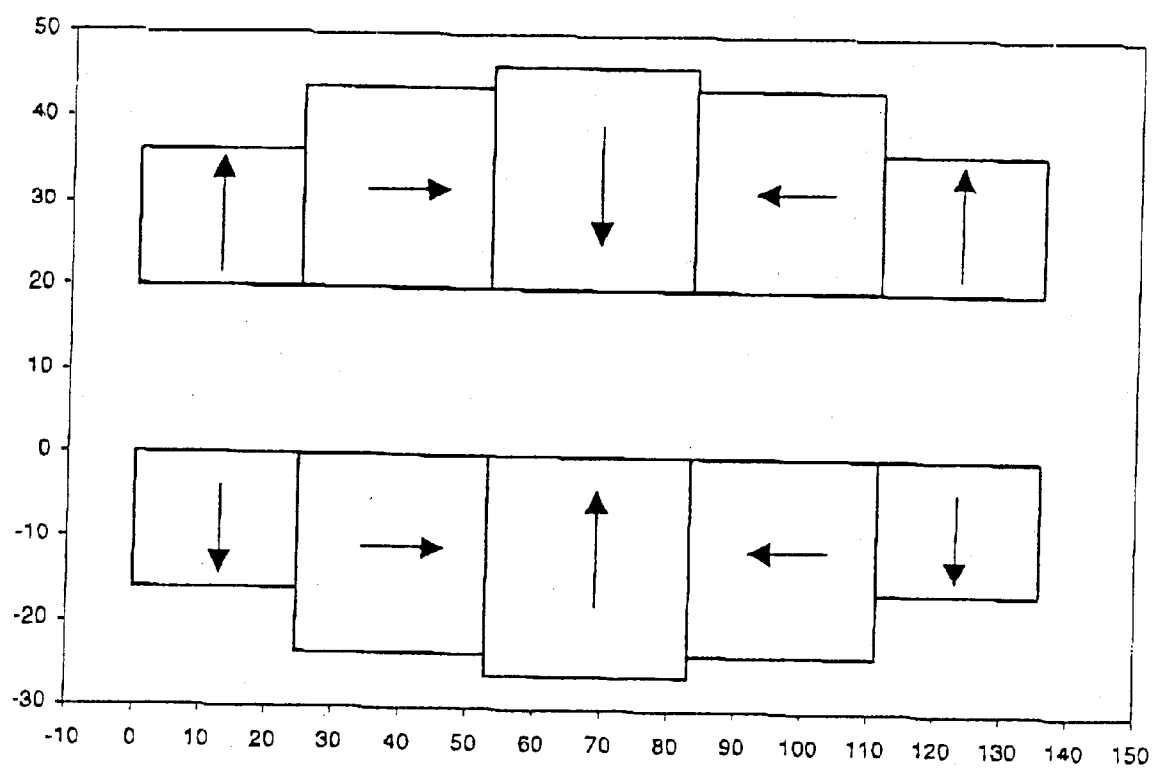
Figure 11G:
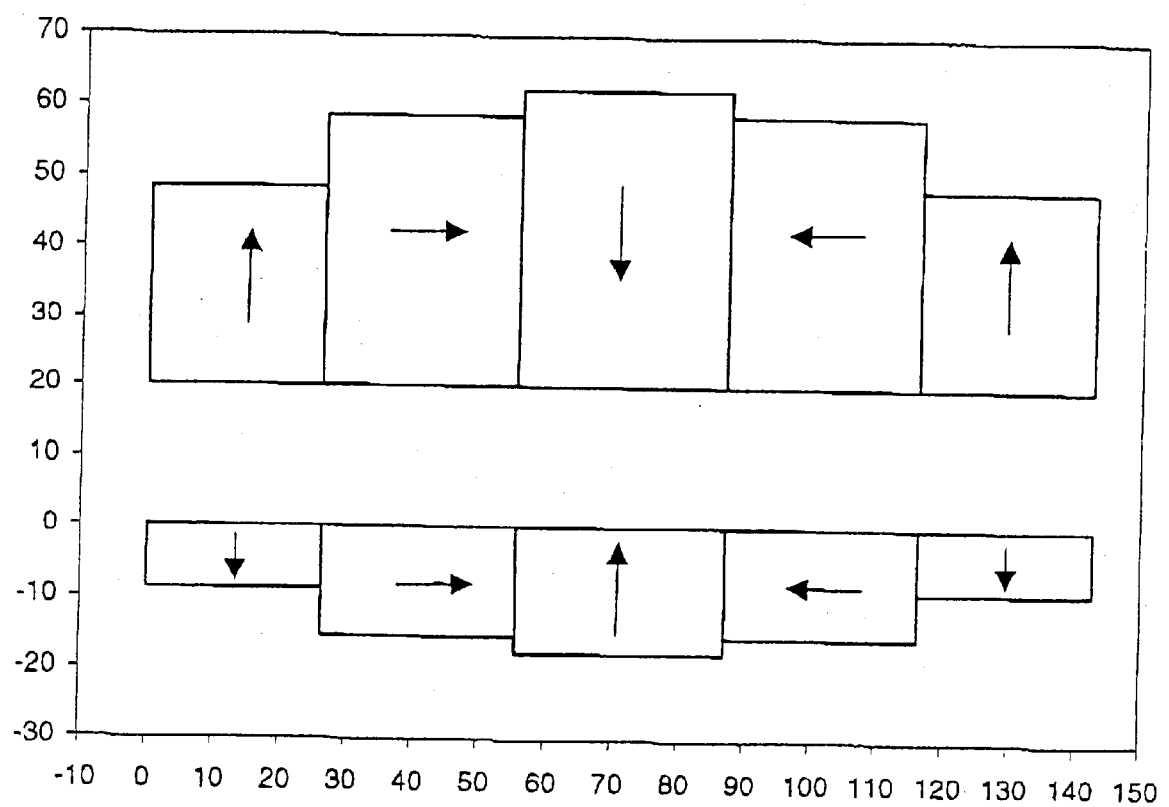
Figure 11H:
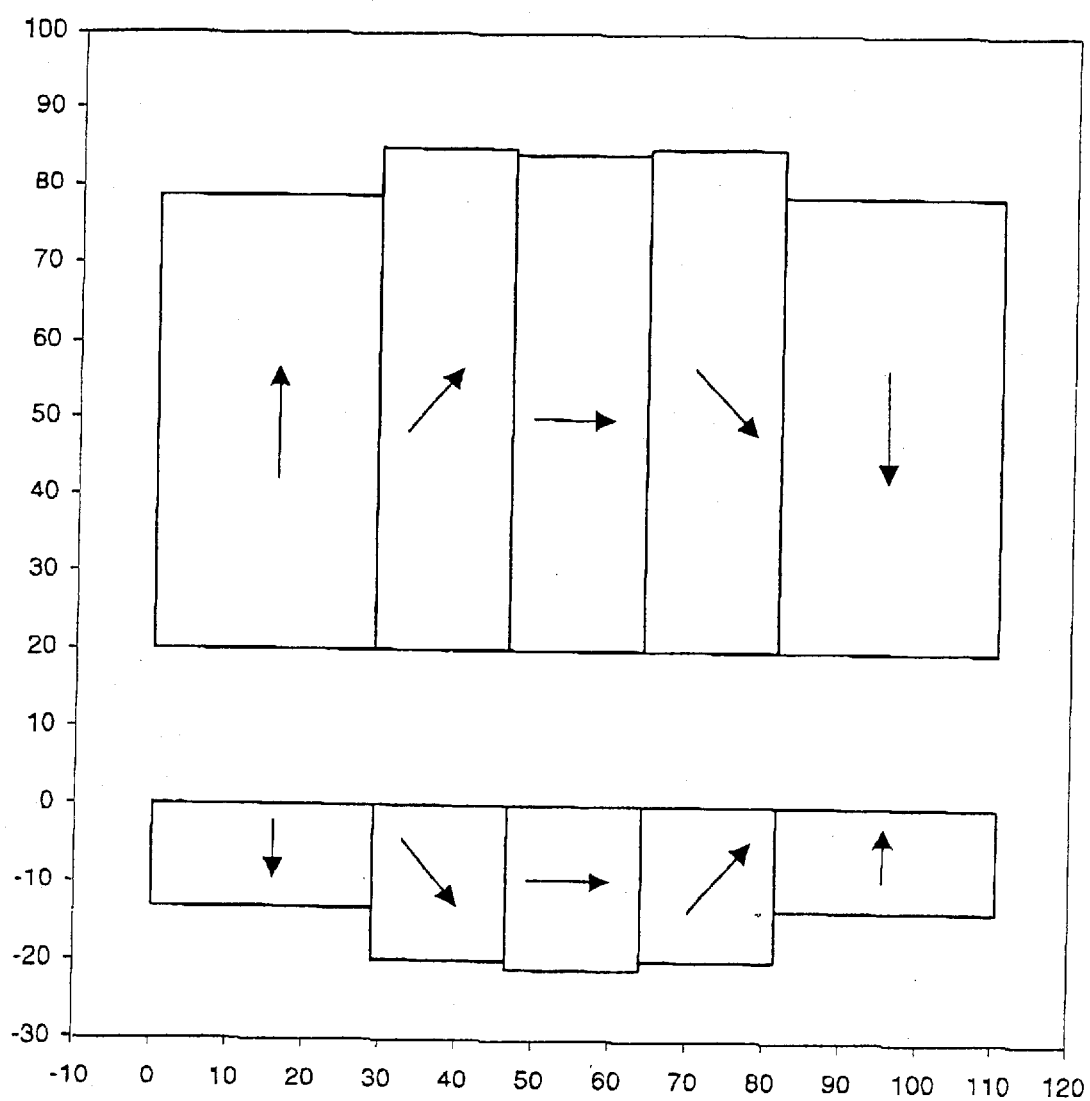

In FIGS. 11f, 11g and 11d, the effects of weighting between the vehicle array and the guideway array cross-section areas on the optimized geometries of the magnets are shown. As shown in FIG. 11f, with a one-to-one weighting, the vehicle array and the guideway array are symmetric. As the weighting goes to 5:1 (FIG. 11g) and 10:1 (FIG. 11d), the optimization leads to smaller guideway magnets as compared to vehicle magnets. Furthermore, different constraints on how magnetization vector rotates can be included in the optimization analysis. In FIG. 11h, an optimization is shown, where five magnets are allowed to have magnetization vectors differing by 45 degree increments.

The foregoing description of the preferred embodiment of the invention has been presented for the purposes of illustration and description. It is not intended to be exhaustive or to limit the invention to the precise form disclosed. Many modifications and variations are possible in light of the above teachings. Therefore, it is intended that the scope of the invention be limited not by this detailed description, but rather by the claims appended hereto.

What is claimed is:

1. A transportation system comprising:
   a guideway having a length dimension and at least one guideway array of permanent magnets extending along the guideway length dimension; and
   a vehicle having at least one permanent magnet arranged to interact with at least one guideway array to provide a lift force on the vehicle sufficient to levitate or contribute to the levitation of the vehicle relative to the guideway, the vehicle further having at least one controllable magnet arranged to interact with at least one guideway array to provide a lateral control force on the vehicle;
   wherein the at least one vehicle controllable magnet and the at least one vehicle permanent magnet are arranged to interact with the same guideway array of magnets.

2. A transportation system as recited in claim 1, wherein the at least one guideway array comprises at least one array of magnets having a lateral cross-sectional configuration of rotating magnetizations, wherein the magnetization vector rotates in a consistent direction when viewed from one side of the lateral cross-section toward the other side of the lateral cross-section.

3. A transportation system as recited in claim 2, wherein each guideway array defines an active surface and wherein the direction of rotation of the magnetization vector is counterclockwise when viewed from the left side of the lateral cross-section toward the right side of the lateral cross-section, with the active surface facing upward.

4. A transportation system as recited in claim 1, wherein the at least one guideway array comprises at least one Halbach array of magnets.

5. A transportation system as recited in claim 1, wherein the at least one guideway array comprises at least one array of magnets having a lateral cross-sectional configuration that provides a stronger magnetic field in the center of the lateral cross-section of the array, relative to the lateral portion of the lateral cross-section of the array.

6. A transportation system as recited in claim 1, wherein the at least one guideway array comprises two distinct arrays of permanent magnets, each extending along the guideway length dimension.

7. A transportation system as recited in claim 6, wherein at least one of the two distinct guideway arrays has a lateral cross-sectional configuration of rotating magnetizations, wherein the magnetization vector rotates in a consistent direction when viewed from one side of the lateral cross-section toward the other side of the lateral cross-section.

8. A transportation system as recited in claim 6, wherein at least one of the two distinct guideway arrays comprises a Halbach array of magnets.

9. A transportation system as recited in claim 6, wherein at least one of the two distinct guideway arrays has a lateral cross-sectional shape that is thicker in the central region of the array cross-section, relative to thinner lateral regions of the array cross-section.

10. A transportation system as recited in claim 6, wherein at least one of the two distinct guideway arrays has a lateral cross-sectional configuration that provides a stronger magnetic field in the center of the lateral cross-section of the array, relative to the lateral portion of the lateral cross-section of the array.

11. A transportation system as recited in claim 1, wherein the at least one vehicle permanent magnet comprises at least one array of magnets having a lateral cross-sectional configuration of rotating magnetizations, wherein the magnetization vector rotates in a consistent direction when viewed from one side of the lateral cross-section toward the other side of the lateral cross-section.

12. A transportation system as recited in claim 11, wherein each vehicle array of magnets defines an active surface and wherein the direction of rotation of the magnetization vector is counterclockwise when viewed from the left side of the lateral cross-section toward the right side of the lateral cross-section, with the active surface facing upward.

13. A transportation system as recited in claim 1, wherein the at least one vehicle permanent magnet comprises at least one Halbach array of magnets.

14. A transportation system as recited in claim 1, wherein the at least one vehicle permanent magnet comprises at least one array of magnets having a lateral cross-sectional configuration that provides a stronger magnetic field in the center of the lateral cross-section of the array, relative to the lateral portion of the lateral cross-section of the array.

15. A transportation system as recited in claim 1, wherein the at least one vehicle permanent magnet comprises at least one array of permanent magnets, and wherein the lateral cross-sectional area of the at least one vehicle array is greater than the lateral cross-sectional area of the at least one guideway array.

16. A transportation system as recited in claim 1, wherein the guideway comprises a tube-shaped structure.

17. A transportation system as recited in claim 16, wherein the tube-shaped structure is partially evacuated.

18. A transportation system as recited in claim 1, wherein at least one vehicle controllable magnet comprises at least one electromagnet arranged on the vehicle.

19. A transportation system as recited in claim 18, wherein the at least one vehicle electromagnet comprises an array of conductive coils coupled to at least one electrical power source.

20. A transportation system as recited in claim 18, wherein the at least one vehicle electromagnet comprises an array of three conductive coils, including a coil for interaction with at least one guideway array of magnets to provide a lift force on the vehicle and a pair of coils for interaction with the at least one guideway array to provide a lateral control force on the vehicle.

21. A transportation system as recited in claim 18, wherein the at least one vehicle permanent magnet is disposed between the at least one vehicle electromagnet and the guideway, when the vehicle is located relative to the guideway for levitation.

22. A transportation system as recited in claim 18, wherein the at least one vehicle electromagnet is disposed between the at least one vehicle permanent magnet and the guideway, when the vehicle is located relative to the guideway for levitation.

23. A transportation system as recited in claim 20, wherein the at least one vehicle permanent magnet comprises an array of magnets and the at least one vehicle electromagnet comprises an array of electromagnets.

24. A transportation system as recited in claim 1, wherein at least one vehicle controllable magnet comprises at least one magnet arranged on the vehicle and movable relative to the vehicle and the guideway, to change the physical orientation of the magnet relative to the guideway for providing and controlling a lateral force on the vehicle.

25. A transportation system as recited in claim 1,
wherein at least one guideway array comprises at least a first magnet; and
wherein the at least one vehicle controllable magnet and the at least one vehicle permanent magnet interact with the first magnet.

26. A transportation system as recited in claim 1,
wherein at least one guideway array comprises at least a first array of magnets;
wherein the at least one vehicle controllable magnet and the at least one vehicle permanent magnet interact with the first array of magnets; and
wherein each magnet in the first array of magnets contributes to levitation of the vehicle.

27. A transportation system as recited in claim 1,
wherein at least one guideway array comprises at least a first array of magnets;
wherein the at least one vehicle controllable magnet and the at least one vehicle permanent magnet interact with the first array of magnets; and
wherein each magnet in the first array of magnets contributes to lateral control of the vehicle.

28. A transportation system as recited in claim 1,
wherein at least one guideway array comprises at least a first array of magnets;
wherein the at least one vehicle controllable magnet and the at least one vehicle permanent magnet interact with the first array of magnets; and
wherein each magnet in the first array of magnets contributes to both levitation and lateral control of the vehicle.

29. A transportation system comprising:
a guideway having a length dimension and at least one guideway array of permanent magnets extending along the guideway length dimension; and
a vehicle having at least one permanent magnet arranged to interact with at least one guideway array to provide a lift force on the vehicle sufficient to levitate or contribute to the levitation of the vehicle relative to the guideway, the vehicle further having at least one controllable magnet arranged to interact with at least one guideway array to provide a lateral control force on the vehicle;
wherein at least one guideway array comprises at least one array of magnets having a lateral cross-sectional shape that is thicker in the central region of the array cross-section, relative to thinner lateral regions of the array cross-section.

30. A transportation system as recited in claim 29,
wherein the thickness of the at least one array of magnets is measured between pole surfaces.

31. A transportation system as recited in claim 29,
wherein the central region of the at least one array of magnets is thicker than any other region of the at least one array of magnets.

32. A transportation system as recited in claim 29,
wherein the lateral regions of the at least one array of magnets are thinner than any other region of the at least one array of magnets.

33. A transportation system comprising:
a guideway having a length dimension and at least one guideway array of permanent magnets extending along the guideway length dimension; and
a vehicle having at least one permanent magnet arranged to interact with at least one guideway array to provide a lift force on the vehicle sufficient to levitate or contribute to the levitation of the vehicle relative to the guideway, the vehicle further having at least one controllable magnet arranged to interact with at least one Guideway array to provide a lateral control force on the vehicle;
wherein the at least one vehicle permanent magnet comprises at least one array of magnets having a lateral cross-sectional shape that is thicker in the central region of the array cross-section, relative to thinner lateral regions of the array cross-section.

34. A transportation system as recited in claim 33,
wherein the thickness of the at least one array of magnets is measured between pole surfaces.

35. A transportation system as recited in claim 33,
wherein the central region of the at least one array of magnets is thicker than any other region of the at least one array of magnets.

36. A transportation system as recited in claim 33,
wherein the lateral regions of the at least one array of magnets are thinner than any other region of the at least one array of magnets.

37. A transportation system comprising:
a guideway having a length dimension and at least one guideway array of permanent magnets extending along the guideway length dimension; and
a vehicle having at least one permanent magnet arranged to interact with at least one guideway array to provide a lift force on the vehicle sufficient to levitate or contribute to the levitation of the vehicle relative to the guideway, the vehicle further having at least one controllable magnet arranged to interact with at least one guideway array to provide a lateral control force on the vehicle;
wherein the vehicle and guideway magnets are arranged relative to each other, such that, upon levitation of the vehicle relative to the guideway, a plane completely separates the vehicle from the guideway.

38. A transportation system as recited in claim 37,
wherein the plane does not intersect any portion of the vehicle.

39. A transportation system as recited in claim 37,
wherein the plane does not intersect any portion of the guideway.

40. A transportation system as recited in claim 37,
wherein the plane does not intersect any portion of the vehicle or the guideway.

41. A magnetic levitation vehicle for traveling along a length of a guideway of a magnetic levitation transportation system, where the guideway is provided with at least one array of permanent magnets along its length, the vehicle comprising:
a vehicle body;
at least one permanent magnet supported by the vehicle body and arranged to interact with at least one guideway array to provide a lift force on the vehicle sufficient to levitate or contribute to the levitation of the vehicle relative to the guideway, and at least one controllable magnet arranged on the vehicle to interact with at least one guideway array to provide a lateral control force on the vehicle;

wherein the at least one vehicle controllable magnet and the at least one vehicle permanent magnet are arranged to interact with the same guideway array of magnets.

42. A vehicle as recited in claim 41, wherein the at least one vehicle permanent magnet comprises at least one array of magnets having a lateral cross-sectional configuration of rotating magnetizations, wherein the magnetization vector rotates in a consistent direction when viewed from one side of the lateral cross-section toward the other side of the lateral cross-section.

43. A vehicle as recited in claim 42, wherein each vehicle array defines an active surface and wherein the direction of rotation of the magnetization vector is counterclockwise when viewed from the left side of the lateral cross-section toward the right side of the lateral cross-section, with the active surfaces facing upward.

44. A vehicle as recited in claim 41, wherein the at least one vehicle permanent magnet comprises at least one Halbach array of magnets.

45. A vehicle as recited in claim 41, wherein the at least one vehicle permanent magnet comprises at least one array of magnets having a lateral cross-sectional configuration that provides a stronger magnetic field in the center of the lateral cross-section of the array, relative to the lateral portion of the lateral cross-section of the array.

46. A vehicle as recited in claim 41, wherein the at least one vehicle permanent magnet comprises at least one array of permanent magnets, and wherein the lateral cross-sectional area of the at least one vehicle array is greater than the lateral cross-sectional area of the at least one guideway array.

47. A magnetic levitation vehicle as recited in claim 41, wherein at least one vehicle controllable magnet comprises at least one electromagnet arranged on the vehicle.

48. A transportation system as recited in claim 41, wherein at least one vehicle controllable magnet comprises at least one magnet arranged on the vehicle and movable relative to the vehicle and the guideway, to change the orientation of the magnet relative to the guideway.

49. A magnetic levitation vehicle for traveling along a length of a guideway of a magnetic levitation transportation system, where the guideway is provided with at least one array of permanent magnets along its length, the vehicle comprising:

a vehicle body;

at least one permanent magnet supported by the vehicle body and arranged to interact with at least one guideway array to provide a lift force on the vehicle sufficient to levitate or contribute to the levitation of the vehicle relative to the guideway, and at least one controllable magnet arranged on the vehicle to interact with at least one guideway array to provide a lateral control force on the vehicle;

wherein the at least one vehicle permanent magnet comprises at least one array of magnets having a lateral cross-sectional shape that is thicker in the central region of the array cross-section, relative to thinner lateral regions of the array cross-section.

50. A vehicle as recited in claim 49, wherein the thickness of the at least one array of magnets is measured between pole surfaces.

51. A vehicle as recited in claim 49, wherein the central region of the at least one array of magnets is thicker than any other region of the at least one array of magnets.

52. A vehicle as recited in claim 49, wherein the lateral regions of the at least one array of magnets are thinner than any other region of the at least one array of magnets.

53. A guideway of a magnetic levitation transportation system for interacting with at least one magnet carried on a vehicle, to levitate the vehicle relative to the guideway, the guideway comprising:

a guideway structure having length dimension; and at least one guideway array of permanent magnets supported by the guideway structure and extending along the guideway length dimension;

wherein the at least one guideway array comprises at least one array of magnets having a lateral cross-sectional configuration of rotating magnetizations, wherein the magnetization vector rotates in a consistent direction when viewed from one side of the lateral cross-section toward the other side of the lateral cross-section;

wherein the at least one guideway array comprises at least one array of magnets having a lateral cross-sectional shave that is thicker in the central region of the array cross-section, relative to thinner lateral regions of the array cross-section.

54. A guideway as recited in claim 53, wherein each guideway array defines an active surface and wherein the direction of rotation of the magnetization vector is counterclockwise when viewed from the left side of the lateral cross-section toward the right side, with the active surface facing upward.

55. A guideway as recited in claim 53, wherein the at least one guideway array comprises at least one Halbach array of magnets.

56. A guideway as recited in claim 53, wherein the at least one guideway array comprises at least one array of magnets having a lateral cross-sectional configuration that provides a stronger magnetic field in the center of the lateral cross-section of the array, relative to the lateral portion of the lateral cross-section of the array.

57. A guideway as recited in claim 53, wherein the at least one guideway arrays comprise two distinct arrays of permanent magnets, each extending along the guideway length dimension.

58. A guideway as recited in claim 57, wherein at least one of the two distinct guideway arrays has a lateral cross-sectional configuration of rotating magnetizations, wherein the magnetization vector rotates in a consistent direction when viewed from one side of the lateral cross-section toward the other side of the lateral cross-section.

59. A guideway as recited in claim 58, wherein at least one of the two distinct guideway arrays comprises a Halbach array of magnets.

60. A guideway as recited in claim 58, wherein at least one of the two distinct guideway arrays has a lateral cross-sectional shape that is thicker in the central region of the array cross-section, relative to thinner lateral regions of the array cross-section.

61. A guideway as recited in claim 58, wherein at least one of the two distinct guideway arrays has a lateral cross-sectional configuration that provides a stronger magnetic field in the center of the lateral cross-section of the array, relative to the lateral portion of the lateral cross-section of the array.

62. A guideway as recited in claim 53, wherein the guideway structure comprises a tube-shaped structure.

63. A guideway as recited in claim 62, wherein the tube-shaped structure is partially evacuated.

64. A guideway as recited in claim 53,
   wherein the at least one array of magnets having a lateral cross-sectional shape that is thicker in the central region of the array cross-section, relative to thinner lateral regions of the array cross-section comprises at least a first array of magnets; and
   wherein the thickness of the first array of magnets is measured between pole surfaces.

65. A guideway as recited in claim 53,
   wherein the at least one array of magnets having a lateral cross-sectional shape that is thicker in the central region of the array cross-section, relative to thinner lateral regions of the array cross-section comprises at least a first array of magnets; and
   wherein the central region of the first array of magnets is thicker than any other region of the first array of magnets.

66. A guideway as recited in claim 53,
   wherein the at least one array of magnets having a lateral cross-sectional shape that is thicker in the central region of the array cross-section, relative to thinner lateral regions of the array cross-section comprises at least a first array of magnets; and
   wherein the lateral regions of the first array of magnets are thinner than any other region of the first array of magnets.

67. A method of levitating a vehicle relative to a guideway, the method comprising:
   disposing at least one array of permanent magnets on a guideway;
   disposing at least one permanent magnet and at least one controllable magnet on a vehicle;
   arranging the vehicle relative to the guideway for magnetic interaction between at least one permanent magnet on the vehicle with at least one array of permanent magnets on the guideway to provide a lift force on the vehicle sufficient to levitate or contribute to the levitation of the vehicle relative to the guideway, and for interaction between at least one vehicle controllable magnet and at least one guideway array to provide a lateral control force on the vehicles
   wherein arranging the vehicle comprises arranging the vehicle relative to the guideway such that the at least one vehicle controllable magnet for providing a lateral control force and the at least one vehicle permanent magnet for providing a lift force are arranged to interact with the same guideway array of magnets.

68. A method as recited in claim 67, wherein the guideway array of magnets is disposed along a length dimension of the guideway and the method further comprises propelling the vehicle along the length dimension of the guideway.

69. A method as recited in claim 67, wherein disposing at least one array of permanent magnets on the guideway comprises disposing on the guideway at least one array of magnets having a lateral cross-sectional configuration of rotating magnetizations, wherein the magnetization vector rotates in a consistent direction when viewed from one side of the lateral cross-section toward the other side of the lateral cross-section.

70. A method as recited in claim 69, wherein the direction of rotation of the magnetization vector is counterclockwise.

71. A method as recited in claim 67, wherein disposing at least one array of permanent magnets on the guideway comprises disposing at least one Halbach array of magnets on the guideway.

72. A method as recited in claim 67, wherein disposing at least one array of permanent magnets on the guideway comprises disposing at least one array of magnets having a lateral cross-sectional configuration that provides a stronger magnetic field in the center of the lateral cross-section of the array, relative to the lateral portion of the lateral cross-section of the array.

73. A method as recited in claim 67, wherein disposing at least one array of permanent magnets on the guideway comprises disposing two distinct arrays of permanent magnets, each extending along the guideway length dimension.

74. A method as recited in claim 73, wherein at least one of the two distinct guideway arrays has a lateral cross-sectional configuration of rotating magnetizations, wherein the magnetization vector rotates in a consistent direction when viewed from one side of the lateral cross-section toward the other side of the lateral cross-section.

75. A method as recited in claim 73, wherein at least one of the two distinct guideway arrays comprises a Halbach array of magnets.

76. A method as recited in claim 73, wherein at least one of the two distinct guideway arrays has a lateral cross-sectional shape that is thicker in the central region of the array cross-section, relative to thinner lateral regions of the array cross-section.

77. A method as recited in claim 73, wherein at least one of the two distinct guideway arrays has a lateral cross-sectional configuration that provides a stronger magnetic field in the center of the lateral cross-section of the array, relative to the lateral portion of the lateral cross-section of the array.

78. A method as recited in claim 67, wherein disposing at least one permanent magnet on the vehicle comprises disposing on the vehicle at least one array of magnets having a lateral cross-sectional configuration of rotating magnetizations, wherein the magnetization vector rotates in a consistent direction when viewed from one side of the lateral cross-section toward the other side of the lateral cross-section.

79. A method as recited in claim 78, wherein each guideway array defines an active surface and wherein the direction of rotation of the magnetization vector is counterclockwise when viewed from the left side of the lateral cross-section toward the right side, with the active surface facing upward.

80. A method as recited in claim 67, wherein disposing at least one permanent magnet on the vehicle comprises disposing at least one Halbach array of magnets on the vehicle.

81. A method as recited in claim 67, wherein disposing at least one permanent magnet on the vehicle comprises disposing on the vehicle at least one array of magnets having a lateral cross-sectional configuration that provides a stronger magnetic field in the center of the lateral cross-section of the array, relative to the lateral portion of the lateral cross-section of the array.

82. A method as recited in claim 67, wherein disposing at least one permanent magnet on the vehicle comprises disposing on the vehicle at least one array of permanent magnets, and wherein the lateral cross-sectional area of the at least one vehicle array is greater than the lateral cross-sectional area of the at least one guideway array.

83. A method as recited in claim 67, wherein at least one vehicle controllable magnet comprises at least one electromagnet arranged on the vehicle.

84. A method as recited in claim 83, wherein the at least one vehicle electromagnet comprises an array of conductive coils coupled to at least one electrical power source.

85. A method as recited in claim 83, wherein the at least one vehicle electromagnet comprises an array of three conductive coils, including a coil for interaction with at least one guideway array of magnets to provide a lift force on the vehicle and a pair of coils for interaction with the at least one guideway array to provide a lateral control force on the vehicle.

86. A method as recited in claim 83, wherein the at least one vehicle permanent magnet is disposed between the at least one vehicle electromagnet and the guideway, when the vehicle is located relative to the guideway for levitation.

87. A method as recited in claim 86, wherein the at least one vehicle permanent magnet comprises an array of magnets and the at least one vehicle electromagnet comprises an array of electromagnets.

88. A method as recited in claim 83, wherein the at least one vehicle electromagnet is disposed between the at least one vehicle permanent magnet and the guideway, when the vehicle is located relative to the guideway for levitation.

89. A method as recited in claim 67,
wherein disposing at least one array of permanent magnets on a guideway comprises disposing at least a first magnet on the guideway; and
wherein arranging the vehicle comprises arranging the vehicle relative to the guideway such that the at least one vehicle controllable magnet for providing a lateral control force and the at least one vehicle permanent magnet for providing a lift force are arranged to interact with the first magnet.

90. A method as recited in claim 67,
wherein disposing at least one array of permanent magnets on a guideway comprises disposing at least a first array of magnets on the guideway;
wherein arranging the vehicle comprises arranging the vehicle relative to the guideway such that the at least one vehicle controllable magnet for providing a lateral control force and the at least one vehicle permanent magnet for providing a lift force are arranged to interact with the first magnet so that each magnet in the first array of magnets contributes to both levitation and lateral control of the vehicle.

91. A method of levitating a vehicle relative to a guideway, the method comprising:
disposing at least one array of permanent magnets on a guideway;
disposing at least one permanent magnet and at least one controllable magnet on a vehicle;
arranging the vehicle relative to the guideway for magnetic interaction between at least one permanent magnet on the vehicle with at least one array of permanent magnets on the guideway to provide a lift force on the vehicle sufficient to levitate or contribute to the levitation of the vehicle relative to the guideway, and for interaction between at least one vehicle controllable magnet and at least one guideway array to provide a lateral control force on the vehicle;
wherein disposing at least one array of permanent magnets on the guideway comprises disposing at least one array of magnets having a lateral cross-sectional shape that is thicker in the central region of the array cross-section, relative to thinner lateral regions of the array cross-section.

92. A method as recited in claim 91,
wherein the thickness of the at least one array of magnets on the guideway is measured between pole surfaces.

93. A method as recited in claim 91,
wherein the central region of the at least one array of magnets on the guideway is thicker than any other region of the at least one array of magnets on the guideway.

94. A method as recited in claim 91,
wherein the lateral regions of the at least one array of magnets on the guideway are thinner than any other region of the at least one array of magnets on the guideway.

95. A method of levitating a vehicle relative to a guideway, the method comprising:
disposing at least one array of permanent magnets on a guideway;
disposing at least one permanent magnet and at least one controllable magnet on a vehicle;
arranging the vehicle relative to the guideway for magnetic interaction between at least one permanent magnet on the vehicle with at least one array of permanent magnets on the guideway to provide a lift force on the vehicle sufficient to levitate or contribute to the levitation of the vehicle relative to the guideway and for interaction between at least one vehicle controllable magnet and at least one guideway array to provide a lateral control force on the vehicle;
wherein disposing at least one permanent magnet on the vehicle comprises disposing on the vehicle at least one array of magnets having a lateral cross-sectional shape that is thicker in the central region of the array cross-section, relative to thinner lateral regions of the array cross-section.

96. A method as recited in claim 95,
wherein the thickness of the at least one array of magnets on the vehicle is measured between pole surfaces.

97. A method as recited in claim 95,
wherein the central region of the at least one array of magnets on the vehicle is thicker than any other region of the at least one array of magnets on the vehicle.

98. A method as recited in claim 95,
wherein the lateral regions of the at least one array of magnets on the vehicle are thinner than any other region of the at least one array of magnets on the vehicle.

99. A magnetic levitation vehicle as recited in claim 47, wherein the at least one vehicle electromagnet comprises an array of conductive coils coupled to at least one electrical power source.

100. A magnetic levitation vehicle as recited in claim 47, wherein the at least one vehicle electromagnet comprises an array of three conductive coils, including a coil for interaction with at least one guideway array of magnets to provide a lift force on the vehicle and a pair of coils for interaction with the at least one guideway array to provide a lateral control force on the vehicle.

101. A magnetic levitation vehicle as recited in claim 47, wherein the at least one vehicle permanent magnet is disposed between the at least one vehicle electromagnet and the guideway, when the vehicle is located relative to the guideway for levitation.

102. A magnetic levitation vehicle as recited in claim 101, wherein the at least one vehicle permanent magnet comprises an array of magnets and the at least one vehicle electromagnet comprises an array of electromagnets.

103. A magnetic levitation vehicle as recited in claim 47, wherein the at least one vehicle electromagnet is disposed between the at least one vehicle permanent magnet and the guideway, when the vehicle is located relative to the guideway for levitation.

104. A method of levitating a vehicle relative to a guideway, the method comprising:

disposing at least one array of permanent magnets on a guideway;

disposing at least one permanent magnet and at least one controllable magnet on a vehicle;

arranging the vehicle relative to the guideway for magnetic interaction between at least one permanent magnet on the vehicle with at least one array of permanent magnets on the guideway to provide a lift force on the vehicle sufficient to levitate or contribute to the levitation of the vehicle relative to the guideway, and for interaction between at least one vehicle controllable magnet and at least one guideway array to provide a lateral control force on the vehicle; and arranging the vehicle and guideway magnets relative to each other, such that, upon levitation of the vehicle relative to the guideway, a plane completely separates the vehicle from the guideway.

105. A method as recited in claim 104, wherein the plane does not intersect any portion of the vehicle.

106. A method as recited in claim 104, wherein the plane does not intersect any portion of the guideway.

107. A method as recited in claim 104, wherein the plane does not intersect any portion of the vehicle or the guideway.

* * * * *